(12) United States Patent
Hughes et al.

(10) Patent No.: US 8,568,016 B2
(45) Date of Patent: Oct. 29, 2013

(54) MOBILE PAINT SYSTEM UTILIZING SLIDER ATTRIBUTE PROMPTS AND REFLECTANCE MEMORY STORAGE

(75) Inventors: Randall L. Hughes, Glendale, AZ (US); Mel Sauder, Mesa, AZ (US); David C. Philbrook, Chandler, AZ (US); C. Daniel McClain, Gilbert, AZ (US)

(73) Assignee: Microblend Technologies, Inc., Gilbert, AZ (US)

( * ) Notice: Subject to any disclaimer, the term of this patent is extended or adjusted under 35 U.S.C. 154(b) by 176 days.

(21) Appl. No.: 13/224,194

(22) Filed: Sep. 1, 2011

(65) Prior Publication Data

US 2011/0313557 A1    Dec. 22, 2011

Related U.S. Application Data

(60) Division of application No. 12/479,659, filed on Jun. 5, 2009, now Pat. No. 8,014,885, which is a continuation-in-part of application No. 10/966,545, filed on Oct. 15, 2004, now abandoned, and a continuation-in-part of application No. 09/578,001, filed on May 24, 2000, now Pat. No. 7,339,000, which is a continuation-in-part of application No. 09/221,332, filed on Dec. 23, 1998, now Pat. No. 6,221,145.

(60) Provisional application No. 60/512,501, filed on Oct. 16, 2003.

(51) Int. Cl.
*B01F 15/02* (2006.01)
*B01F 15/04* (2006.01)

(52) U.S. Cl.
USPC ............... 366/142; 366/151.1; 366/160.1; 700/285

(58) Field of Classification Search
USPC ............... 366/142, 151.1, 160.1; 700/285
See application file for complete search history.

(56) References Cited

U.S. PATENT DOCUMENTS

| | | | | |
|---|---|---|---|---|
| 5,126,173 A * | 6/1992 | Machenaud | ............... | 427/426 |
| 6,052,195 A * | 4/2000 | Mestha et al. | ............... | 356/425 |
| 6,118,521 A * | 9/2000 | Jung et al. | ............... | 356/73 |
| 7,339,000 B1 * | 3/2008 | McClain et al. | ............... | 524/495 |
| 8,014,885 B2 * | 9/2011 | Hughes et al. | ............... | 700/97 |
| 2001/0030748 A1 * | 10/2001 | Jung et al. | ............... | 356/419 |
| 2001/0038451 A1 * | 11/2001 | Jung et al. | ............... | 356/328 |
| 2001/0043330 A1 * | 11/2001 | Jung et al. | ............... | 356/419 |
| 2001/0050030 A1 * | 12/2001 | Friel et al. | ............... | 106/31.01 |
| 2003/0151611 A1 * | 8/2003 | Turpin et al. | ............... | 345/589 |
| 2011/0313557 A1 * | 12/2011 | Hughes et al. | ............... | 700/97 |

\* cited by examiner

*Primary Examiner* — Tony G Soohoo
(74) *Attorney, Agent, or Firm* — Schmeiser, Olsen & Watts LLP

(57) ABSTRACT

What is disclosed is a plurality of prepaints which are used in any combination to produce base paints and/or colored paints of varying end-use application characteristics. Additionally, a mobile paint factory for producing a plurality of lines of paints from a plurality of prepaints en route to and/or at various locations is disclosed, which may include a vehicle having a paint production system, a spectrometer and a gloss meter. Furthermore, a method of producing a plurality of lines of user-selected paints from a plurality of prepaints en route to and/or at various locations is disclosed. The method may include: providing a mobile paint factory; prompting a user to select a value for a paint attribute on a slider; and automatically dispensing predetermined amounts of appropriate prepaints. The method may also comprise storing information about the reflectance of produced paints in a local data storage device.

9 Claims, 7 Drawing Sheets

MOBILE PAINT SYSTEM UTILIZING SLIDER ATTRIBUTE PROMPTS AND REFLECTANCE MEMORY STORAGE

CROSS REFERENCE TO RELATED APPLICATIONS

This application is a divisional of U.S. patent application by C. Daniel McClain entitled "MOBILE PAINT SYSTEM UTILIZING SLIDER ATTRIBUTE PROMPTS AND REFLECTANCE MEMORY STORAGE", Ser. No. 12/479,659, filed Jun. 5, 2009 now U.S. Pat. No. 8,014,885, which claims priority to a continuation in part of U.S. patent application by C. Daniel McClain entitled "COLOR INTEGRATED AND MOBILE PAINT SYSTEMS FOR PRODUCING PAINT FROM A PLURALITY OF PREPAINT COMPONENTS," Ser. No. 10/966,545, filed Oct. 15, 2004 now abandoned which claims priority to U.S. Provisional Patent Application by C. Daniel McClain entitled "COLOR INTEGRATED AND MOBILE PAINT SYSTEMS USING PAINT CREATED FROM A PLURALITY OF PREPAINT COMPONENTS," Ser. No. 60/512,501, filed Oct. 16, 2003, and is a continuation-in-part to the earlier U.S. Utility patent application by C. Daniel McClain entitled "METHOD AND APPARATUS FOR PRODUCING AN AQUEOUS PAINT COMPOSITION FROM A PLURALITY OF PREMIXED COMPOSITIONS", Ser. No. 09/578,001, filed May 24, 2000, now U.S. Pat. No. 7,339,000, which is a continuation-in-part of the earlier U.S. Utility patent application by C. Daniel McClain entitled "METHOD OF PRODUCING AN AQUEOUS PAINT COMPOSITION FROM A PLURALITY OF PREMIXED COMPONENTS", Ser. No. 09/221,332, filed Dec. 23, 1998, now U.S. Pat. No. 6,221,145, all the disclosures of which are all hereby incorporated herein entirely by reference.

BACKGROUND OF THE INVENTION

1. Technical Field

This invention relates to the coatings industry and more specifically to the consistent on demand production of an aqueous paint having any end-use application characteristic from a plurality of prepaints at the point of sale and/or use within minutes of an operator's selection using a common automated computer controlled paint production apparatus for example.

2. State of the Art

For decades now, paint has been manufactured, packaged, warehoused, and inventoried at large paint factories many miles from its final destination. A significant investment in paint factories, equipment, and ingredients is necessary to offer the large variety of paints desired by retailers and consumers. Because of this large investment, it has been economically necessary to limit paint factories to large-scale operations.

Paint is generally manufactured at a paint manufacturing factory and then transported in separate containers to a point of sale, wherein each container contains one type of paint. Different types of paint typically comprise different types of paint ingredients in various amounts. Conventional paint manufacturing processes require that the paint be made using extensive independent ingredients to create paint with the desired characteristics. Formulating paints is complex; it is not simply a matter of mixing a few paint ingredients in different ratios. Rather, it involves the selection and mixing of different paint ingredients in different ratios depending on the type of paint desired. The type and amount of paint ingredients included in the paint determines its characteristics, such as drying time, quality level, sheen, finish, texture, etc. For example, some types of paint have a flat finish and others have a high-gloss finish. This requires paint factories to store many different paint ingredients and change paint ingredients during manufacture depending on the specific paint type being prepared.

In conventional paint manufacturing processes in a paint factory, ingredients such as solvents, dispersants, surfactants, and defoamers (typically liquids) are placed into a mill, such as a high-speed disperser, according to a set formula for a paint to be made in that particular factory machine. The liquids are blended together to make a homogeneous mixture. Dry pigments are then added slowly to this mixture while the disperser is running at low speed until they are mixed into the liquid phase. The mill is then run at a high speed to shear the mixture and disperse the dry pigments to the desired particle size. Upon approval of the pigment dispersion by the Quality Control Laboratory (typically referred to as the "grind" in the paint industry), the "let down" process begins. Storage for any significant period of time of the pigment dispersion results in settling and a non-uniform distribution of constituents throughout the premix. Consequently, the manufacturing processes are designed to limit the residence time of the pigment dispersion in the mill in order to promote the manufacture of more uniform products. One or more resins are then added to the pigment dispersion depending on the desired paint type. Other liquid or dry additives are added that yield properties such as proper film formation, open time, gloss, wetting, and many others. Finally, thickening agents are added to give the final desired end-use application characteristics.

Because these processes are different for each paint quality, sheen, color base type, and exterior/interior characteristic combination of paint produced, and because the process is time consuming, involves numerous consecutive steps and people, each machine is conventionally set up to produce one type of paint only. The produced paint is placed in a quart, one gallon, two gallon can or 5 gallon bucket and shipped to a retail store and stored until resale.

At the retail store, such as Home Depot, a customer selects a can of paint off the shelf that holds paint having the color base type, sheen, quality and exterior/interior characteristics needed by the customer. The customer may also request that a colorant be added to the paint in the can.

Because conventional paint is made at the factory and cannot practically be made at the store, retailers are forced to order, receive, warehouse, stock, and inventory hundreds of SKUs and thousands of buckets of paint in their stores in order to offer a range of paints. The transport and storage in the individual containers adds significantly to the cost of the sold product for it is necessary to inventory a wide variety of paints having different end-use application characteristics to satisfy and anticipate consumer demand, such as various sheen levels, tint bases, paints for exterior use, paints for interior use, and paints of varying quality. If too many cans of one type of paint are ordered, it may go to waste. While the paint cans are waiting to be purchased, they fill floor space that could have been used by other paints or products, and cost money to keep in the store. Sales may also be lost because not enough cans holding paint of one particular type is available from the premixed paint cans in the store.

Thus, there continues to be a long felt need to reduce paint factory equipment, and ingredient investment so that paint manufacturers may have more flexibility in locating their paint factories. There also continues to be a long felt need to reduce the variety of paint types that a retail store must stock, while still providing for the various paint types desired by consumers. Accordingly, what is needed are improved methods of formulating and consistently manufacturing paint having virtually any end-use application characteristic on demand at the factory, point of sale (e.g. retail store), and/or point of use (e.g. application sight) using a limited number of premixed paint ingredient compositions to prepare all of the different paint types desired, thus, minimizing the number and type of paint ingredients needed to make a range of paints.

DISCLOSURE OF THE INVENTION

The present invention may be readily adapted to a variety of aqueous prepaints and methods, apparatuses, and systems for producing an aqueous paint. The present invention is a complete shift in the paint industry's methodologies. It produces the full spectrum of quality, high-performance latex paints and architectural coatings in a better, less expensive, environmentally friendlier, and much more efficient manner than any existing method.

Accordingly, for example, the present invention may automate the paint production process to a point where an empty can or bucket may be placed into an apparatus, an operator may select a list of particular end-use application characteristics for the paint to be produced, and aqueous prepaints may be mixed by the apparatus to automatically generate a can or bucket of paint having the characteristics selected by the operator on demand using a common apparatus. Conventional paint making processes are very specific to the characteristics of the paint being produced in that batch and, until the present invention, have not been controllable to the degree accomplished by the present invention.

On the contrary, the invention disclosed in the present application, because of the particular and unique combination of materials not previously mixed in this way before, allow for a homogeneous pre-mixture of components into aqueous prepaints that remain stable and do not settle out over time. Furthermore, specific combinations of these aqueous prepaints have been determined that enable an operator to consistently create paint from the aqueous prepaints based upon an operator's selection of any combination of end-use application paint characteristics (the full paint line of a paint manufacturer). Different quantities of the set of aqueous prepaints are used to create paint having each combination of paint characteristics. For example, customers may go to the paint counter of the store and request the desired paint characteristics and walk out with the paint made-to-order within minutes. While the final paint quality and characteristics of conventional paint and paint produced by the methods of the present invention are comparable, the methods of the present invention produce paint in a significantly different way which was not performed in or obvious from the art previously.

Thus, the present invention provides significant advantages for customers and retailers alike in consumer convenience, consumer price, customer (retail store) profits, environmental compliance and related public relations opportunities, and the ability to private label for example. These advantages are discussed separately below.

For consumer convenience, one of the most critical elements to success in retail is location. With a possible thirteen and a half square foot "footprint" of the present invention for example, the present invention may be used in retail locations never before considered to be potential retailers of paint. Consumer convenience would be tremendously enhanced through the availability of purchasing paint at locations such as the local furniture or grocery store. Also adding to consumer convenience will be the fact that from the present invention, in the future, every retailer is expected to be able to offer every SKU of latex paint in several different quality grades (basic/improved/premium). Currently almost every store is limited to what they can carry. Even Wal-Mart offers a limited selection of paint. Consumer convenience will be dramatically improved with the ability to purchase whatever grade or type of paint is needed and the assurance of never being out of stock wherever the present invention is located. For large contractors, the possibility of a mobile paint lab would enhance contractor convenience to the point that the paint would be produced on site. The contractor would be able to produce what they need, when and where they need it.

The mobile paint lab also allows users to easily match paint previously applied to walls. Whereas, in the prior art, a user would have to find a sample of the paint that could be taken to the paint store, with the present invention, the mobile paint lab could be equipped with a gloss meter and a spectrometer which would allow a user to match the color and gloss of paint on a wall. The paint could then be manufactured on location in the amount needed. This also allows a user to easily match faded or discolored paint because the paint on the wall itself can be matched, instead of trying to match an empty paint can or other paint sample.

The user would also be able to select paint attributes such as gloss, color and sheen on a slider in order to better meet the user's needs.

Reflectance is the proportion of light that a surface reflects compared to the amount of light that falls on that surface. Information about the reflectance of a paint manufactured by the mobile paint lab could be stored in a local data storage device coupled to the mobile paint lab. This information could later be used to recreate the paint, and even allow the user to take into account fading.

The present invention also enables the delivery of a full line of quality, architectural paint products to customers at a competitively low price. Retailers will be able to compete on price as they choose due to the savings on occupancy costs (less selling space required) and the operational costs as described below. Retailers will be able to pass-on all or part of the savings to consumers. Even if they choose to retain the savings as additional profits, the overall consumer price should be less than paint at traditional paint stores. The ability of the present invention to sell non-traditional volumes of paint to the consumer based on the consumer's unique needs will provide a price advantage that no traditional paint manufacturer can begin to compete against. For example, if a consumer needs 1.4 gallons of paint for a certain job, currently they have to purchase two gallons and store or throw away the left over. If the cost per gallon is $20, they currently spend $40 to do the job. Even if the same per gallon retail cost is maintained, future technology applications of the present invention are expected to allow consumers to order 1.4 gallons at a total cost of only $28 . . . a 30% savings for the consumer.

The present invention is also expected to maximize retailers' profits in their paint departments. Currently, in a continuing effort to manage their inventory investment, paint retailers are faced with the constant challenge of estimating how many of each of their hundreds of SKUs of paint will be sold during any given time period. Then through their established just-in-time inventory procedures, they order the expected quantity three weeks to three months ahead of time to meet the estimated inventory requirements. Often, a contractor or consumer will visit the store and purchase a larger than expected quantity of a certain SKU of paint. As a result, the retailer will be out of stock for the three weeks to three month period that it takes to reorder and restock. In the mean time, the retailer loses sales on that SKU due to their out-of-stock situation.

The present invention totally eliminates this issue. Since all of the various SKUs of paint are produced from the same system and same components, no crystal ball procedures are required to project the product mix and sales level for the future. Retailers are never out of stock of even the slowest moving SKU of paint that they sell.

Additionally, because the present invention may produce different quality levels of every type of latex paint, retailers will no longer have to choose which SKUs to stock and which SKUs to ignore due to space constraints. For example, the present invention will be able to provide an economy grade, a medium grade, and a high quality grade of every SKU of latex paint. Furthermore, since the amount of space required for the paint department will be dramatically reduced due to the present invention, retailers will be able to display and sell additional items in the retail space previously occupied by paint cans. This will increase the retail sales of the store.

The present invention will also offer retailers dramatic cost savings. With the present invention, retailers are expected to enjoy savings on inventory related costs due to among other things: the dramatic reduction of their inventory investment (only need the limited number of aqueous prepaints used with the present invention instead of large quantities of SKUs of paint inventory); the maximization of inventory turns (retailers generally average four to six turns per year in their paint departments; will be increased many times over by only stocking the limited number of aqueous prepaints and totally eliminating unused and slow moving inventory); the reduction in shrinkage (every gallon is accounted for because only authorized operators may be able to use the present invention); the elimination of the costs of overstocking/unused inventory (miscalculation of product mix) or under-stocking (rush orders to refill) inventory; and the losses associated with poor inventory management systems.

Since the amount of space required for the paint department will be dramatically reduced due to the present invention, there should be a corresponding savings in occupancy costs. An entire paint store is expected to be able to operate in a space less than 1,000 square feet as compared to current paint stores currently operating in excess of 10,000 square feet. Paint departments are expected to be able to be reduced to a few hundred square feet.

The present invention is expected to reduce or eliminate many significant operational costs and time-consuming procedures currently burdening paint retailers. One such savings is the savings of labor and the costs related to payroll (especially Workers' Compensation). In the retail setting, the average number of times labor physically comes in contact with a paint bucket is ten to fifteen times from the time retailers accept delivery from the supplier to the time it leaves the store after the sale. The Paint System is projected to reduce that number to as low as four times since all product is purchased and delivered in bulk. Also reduced is the labor and complexity involved in purchasing along with a significant reduction in the cost of freight.

In terms of environmental compliance and related public relations opportunities, a relatively new but significant issue in the paint industry is the result of heightened awareness of environmental regulations. When paint is applied to a surface it is wet. As some paints begin to dry, they may emit organic compounds (VROCs) that are sufficiently volatile and reactive to contribute to ozone (smog) formation. VROCs are considered a hazard to clean air, and have gained the attention of governmental regulators. Regulations are constantly being adopted that limit the amount of VROCs that are acceptable. Paint produced according to the present invention is expected to be in compliance with even the strictest regulations, with many of paint products scoring a zero VROC rating. In addition, environmental groups in several states are mounting pressure on regulatory agencies and local and state governments to begin forcing paint manufacturers to add a per gallon surcharge of as much as fifty cents to support facilities for recycling left over paint. With the ability to dispense nontraditional volumes of paint and therefore dramatically reduce leftover paint, the present invention provides outstanding environmentally related public relation opportunities to retailers and customers.

One of the significant current trends is the desire of retailers to be able to private label their products. Because of the present inventions ability to produce paint and the associated product label on demand, the present invention has the flexibility to offer retailers the ability to private label without any additional costs. To compete, traditional manufacturers would be required to make huge investments in specially labeled paint cans of all sizes, warehouse all of the filled, specially labeled paint cans in preparation for the retailers order, then work through all of the special complications of filling the special orders and ship them to each store as requested.

The foregoing and other features and advantages of the invention will be apparent from the following more particular description of the invention, as exemplarily illustrated in the accompanying drawings.

BRIEF DESCRIPTION OF THE DRAWINGS

Embodiments of the present invention will hereinafter be described in conjunction with the appended drawings, where like designations denote like elements.

DETAILED DESCRIPTION OF EMBODIMENTS OF THE INVENTION

Figure 1:
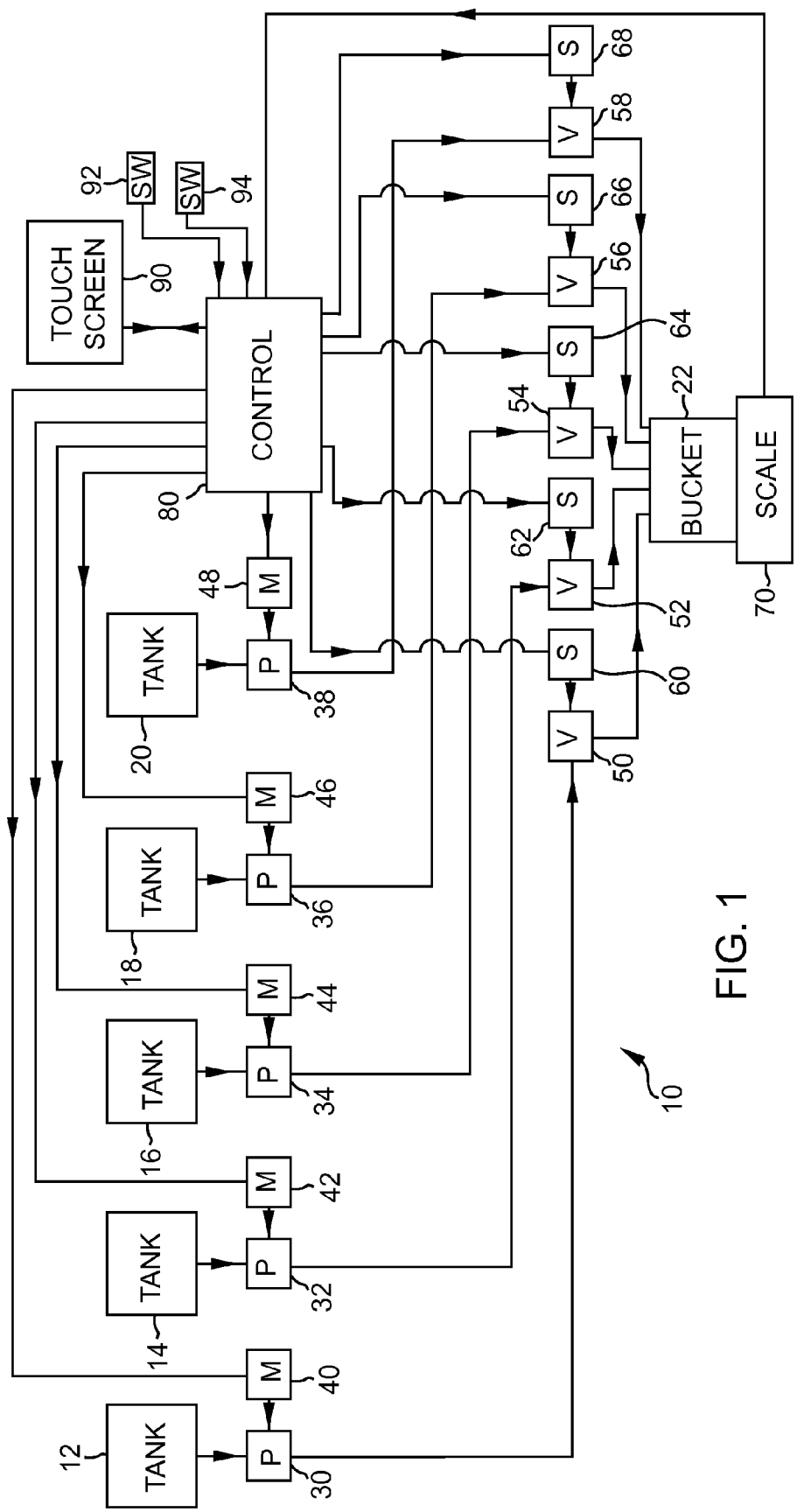
FIG. 1 is a schematic view of a paint production apparatus configured according to an embodiment of the present invention.

Overview, Terminology, and Definitions.

The present invention may be readily adapted to a variety of prepaints and methods, apparatuses, and systems for producing an aqueous paint. With embodiments of the present invention, an aqueous paint having any end-use application characteristic may be consistently produced on demand from a plurality of prepaints at the point of sale and/or use within minutes of an operator's selection using a common automated computer controlled paint production apparatus for example.

The invention is particularly useful in the consistent on demand production of latex paint having any end-use application characteristic at the factory, point of sale, and/or point of use. However, it will be understood by those of ordinary skill in the art that the invention is not limited to the production of latex paint. Rather, any description relating to latex paint is for the exemplary purposes of this disclosure, and those of ordinary skill in the art will also understand that the invention may also produce a wide variety of paints with similar results, such as architectural coatings, industrial coatings, graphic arts coating, elastomeric coatings, non-cementitious, aggregate finish coatings, and the like.

Moreover, it will be understood by those of ordinary skill in the art that the invention is not limited to the specific aqueous paints, paint production methods, aqueous prepaints, apparatuses, systems, and other components disclosed herein, as virtually any aqueous paints, paint production methods, aqueous prepaints, apparatuses, systems, and other components consistent with the intended operation and use of a method, apparatus and/or system of the invention for producing an aqueous paint from a plurality of prepaints may be utilized. Accordingly, for example, although particular aqueous paints, paint production methods, prepaints, apparatuses, systems, and other components are disclosed, such paints, methods, prepaints, apparatuses, systems, and other components may comprise any shape, size, style, type, model, version, material, ingredient, characteristic, measurement, concentration, range, quantity, proportion, percentage by weight, and/or the like consistent with the intended operation and use of a method, apparatus, and/or system of the invention for producing an aqueous paint from a plurality of prepaints. It will also be understood by those of ordinary skill in the art that the invention is not limited to use of any specific paints, methods, prepaints, apparatuses, systems, and other components, provided that the paints, methods, prepaints, apparatuses, systems, and other components selected are consistent with the intended operation and use of a method, apparatus, and/or system of the invention for producing an aqueous paint from a plurality of prepaints. Furthermore, ranges and examples given herein are for particular working formulations and one of ordinary skill in the art would understand that other formulations and the like are possible using other amounts of components.

In describing and claiming the present invention, the following terminology will be used in accordance with the definitions set out below. Notwithstanding, other terminology and definitions may also be found throughout this disclosure as well.

A "paint line", as used herein, includes at least two different paints which offer dried film properties which differ materially from each other in at least one observable property such as sheen, outdoor durability or color depth. A paint line may include, for example, three paints the dried films of which have different sheen levels, two paints the dried films of which have suitable interior or exterior performance, or four paints the dried films of which offer different quality or performance levels such as may be evidenced, for example, by different levels of scrub resistance. A paint line could, more particularly, include four different paints, the dried films of which have different sheen levels, typically marketed as gloss; semi-gloss; eggshell, satin, or low luster; and flat. The sheen is determined by the volume and type of the binder(s), pigment(s), and extender(s), if any, in the paint. In addition to the various sheen levels, paints are commonly formulated to be neutral or accent (no or very low level of opacifying pigment), untinted (white) or tinted to a wide variety of colors using different tint bases, including pastel or light tones, medium or mid-tones, and deep tones. This capability requires a paint line having as many as five paints. Also, paints are formulated for exterior or interior use. And, paints are formulated to provide certain levels of performance properties, such as may be marketed as good/standard, better and best/premium.

Paint manufacturers and retailers typically offer a range of paints which include at least two paint lines. By "the range including at least two paint lines" herein is meant that the discrete elected levels of the observable property defining a first paint line are combined with the discrete elected levels of the observable property defining a second paint line, etc. to define the paints in the range of paints.

As used herein, "paint" is a term used in its broadest sense and refers to any coating that may be applied to a surface for decorative, protective, or both purposes. Paints are distinguished based on their end-use application characteristics. After a latex paint for example is formulated and applied to a surface, the paint dries by evaporation of the water, with or without the application of heat, and the binder forms a film containing therein the pigment and the extender particles, if any. Paints are not limited to only latex paints though. Paints may be any water-borne coating or related building products which require mixing ingredients including graphic arts, sealants, caulks, mastics, adhesives, varnishes, architectural coatings (homeowner-applied and contractor-applied wall coatings, elastomeric wall and roof coatings, and non-cementitious, aggregate finish coatings), and industrial coatings (such as those classified as original equipment manufacturing, maintenance, wood, metal, general industrial finishes, and other factory-applied coatings, as well as a minor portion of non-architectural type coatings applied by do-it-yourselfers).

As used herein, "base paints" are paints of varying end-use application characteristics to which colorant may be added to form a range of colored paints. A large number of colored paints may be formed from each base paint by the addition of colorants. Base tint determines the appearance of a paint when colorants are added to the base paint. A typical manufacturer's consumer paint line may include a number of different base tints which, by the addition of optional colorants, may provide an extensive palette of colors. Thus, base paints are similar to paints commonly provided by manufacturers to retail locations and which are subsequently colored at the retail location in response to a color selection by a customer.

As used herein, an "aqueous prepaint" "or a "prepaint" refers to any premixed aqueous composition which may be mixed with one or more other prepaints to form any base paint of varying end-use application characteristics at the factory, point of sale, point of use, and/or en route to the point of sale and/or point of use. The prepaints may exhibit stable characteristics during storage (may not require agitation) and are specifically formulated to provide the specific chemical properties that create end-use application characteristics that are prescribed in a unit of a finished base paint.

A prepaint may be any one of any number of prepaints. For example, a prepaint may be one of seven prepaints including a pigment prepaint, a dilutant prepaint, an extender prepaint, a high resin content binder prepaint, a low resin content binder prepaint, an elastomeric prepaint, and a fire retardant prepaint. The prepaints are selected so that they may be used to form multiple different base paints. That is, multiple base paints may be formed from the prepaints through the combination of the prepaints in accordance with prepaint ratios associated with each of the other base paints. To do so, it is desirable that the prepaints be mutually compatible. Mutually compatible prepaints are those that may be combined without undesirable side effects, such as colloidal instability (e.g. flocculation). That is, they are at their full point of dispersion and they may be blended. The prepaints may also have the same or similar viscosities to aid in blending.

A base paint's end-use application characteristics are determined by the ratio of the prepaints combined to produce the base paint. End-use application characteristics may include visual characteristics such as paint sheen (e.g., flat, eggshell, satin, semi-gloss, or high-gloss), paint application environment (e.g., interior or exterior), quality (e.g., basic, improved, or premium; or e.g., pro, premium, or platinum), and base tint (e.g., white base, pastel or light tone base, medium or mid-tone base, or deep base). As one example, if there were only these five paint sheens, two application environments, three quality levels, and four base tints, in all their permutations, a collection of 120 base paints (5×2×3×4=120) would be formed, each having different end-use application characteristics. The 120 different base paints may then be pailed off into quarts, one gallon, two gallon, five gallon and 55 gallon drums (5) for example which accounts for 600 SKUs (120×5=600). Notwithstanding, it will be apparent to those of ordinary skill in the art that more than five paint sheens, three quality levels, and/or and five container sizes for example may be used, thereby further increasing the number of possible base paints and SKU's.

As used herein, a "pigment prepaint" refers to a prepaint that gives the base paint it is used in all the substances that the base paint will need to form properly, to resist weathering, and to balance the base paint's properties so that the finished product is a base paint. The percentage by weight and type of pigments in the pigment prepaint determines the sheen of the paint. Suitable pigments include titanium dioxide ($TiO_2$) or a combination of titanium dioxide and auxiliary hiding pigments such as voided latex polymer particles, zinc oxide, lead oxide, a synthetic polymer pigment and mixtures thereof. Rutile and anatase grades of titanium dioxide are suitable for use herein. The surface of these titanium dioxides may be treated with various organic surface treatments and/or inorganic surface treatments, e.g., treatment with the oxides of silica, alumina, and zirconia. Fumed titanium oxide may also be useful herein.

As used herein, a "dilutant prepaint" refers to a thickening-dispersant prepaint. A "thickener" is a general term used to describe any material added to a paint to modify its rheological profile. Thickeners may be associative thickeners. Suitable thickeners for use herein include polyvinyl alcohol, hydrophobically-modified, alkali soluble emulsions known in the art as HASE emulsions, alkali-soluble or alkali-swellable emulsions known in the art as ASE emulsions, hydrophobically-modified, ethylene oxide-urethane polymers known in the art as HEUR thickeners, and cellulosic thickeners such as hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, 2-hydoxypropyl cellulose, and the like. Also useful as thickeners are fumed silica, attapulgite clay and other types of clay, titanate chelating agents, and the like.

A "dispersant" is a general term used to describe any material added to a base paint to reduce the surface tension of the aqueous base paint. Suitable dispersants for use herein include non-ionic, anionic and cationic dispersants such as 2-amino 2-methyl 1-propanol (AMP), dimethyl amino ethanol (DMAE), potassium tripolyphosphate (KTPP), trisodium polyphosphate (TSPP), citric acid and other carboxylic acids, and the like. Also suitable for use as dispersants are Anionic polymers such as homopolymers and copolymers based on polycarboxylic acids, including those that have been hydrophobically- or hydrophilically-modified, e.g., polyacrylic acid or polymethacrylic acid or maleic anhydride with various monomers such as styrene, acrylate or methacrylate esters, diisobutylene, and other hydrophilic or hydrophobic comonomers as well as the salts of the aforementioned dispersants, and mixtures thereof.

As used herein, an "extender prepaint" refers to a prepaint having inorganic solids or opaque polymers which do not impart the primary color or hiding power to the base paint although they may have secondary influences on those properties. The percentage by weight and type of extenders in the extender prepaint determines the sheen of the paint. Suitable extenders include barium sulfate (1-15 microns), Blanc Fixe (0.5-5 microns), calcium carbonate (0.05-35 microns), silica (0.001-14 microns), magnesium silicate (0.5-15 microns), aluminum silicate (0.2-5 microns), nepheline syenite, mica, bentonite, magnesium alumino-silicate, fumed allumina, colloidal attapulgite, synthetic amorphous sodium alumino-silicate, sodium potassium alumino-silicate, and the like.

As used herein, a "binder prepaint" refers to either a high resin content binder prepaint or a low resin content binder prepaint. Latex polymeric binders are polymers or prepolymers which generally form the primary paint film. They bind the pigment and/or extenders, provide the required paint flow, and determine the hardness of the final paint film. The percentage by weight and type of binders in the binder prepaint also determines the sheen of the paint. The binders selected for the base paints will depend upon the final use of the formulated base paints. Binders suitable for exterior paints are generally suitable for interior paints, but binders suitable for interior paints may not be suitable for exterior paints.

Suitable latex polymeric binders include, but are not limited to, homopolymers, copolymers or terpolymers such as, for example, acrylic and/or methacrylic polymers or copolymers, polyvinyl acetate (PVA), styrene-acrylic copolymers, styrene-butadiene, vinyl acetate-acrylic copolymers, ethylene-vinyl acetate copolymers, vinyl acetate-vinyl versatate copolymers, vinyl acetate-vinyl maleate copolymers, vinyl acetate-vinyl chloride-acrylic terpolymers, ethylene-vinyl acetate-acrylic terpolymers, and urethane polymers. The polymers may contain up to 10% by weight of functional monomers, (for example, but not limited to, carboxylic acid, phosphate, sulfate, sulfonate and amide) groups, other monomers, and mixtures thereof.

It is conceivable that for industrial coatings the binder prepaints will employ a wide range of thermoplastic and thermosetting polymeric binders, that may be one-part, two-part or energy-curable including but not limited to: asphalt, paraffin wax, coal tar, alkyds, vinyl acetate, vinyl acetate/acrylic, styrene-butadiene, saturated polyester, unsaturated polyester, polyurethane, acrylic lacquer, acrylic enamel, acrylic latex, acrylic thermosetting, acrylic electrodeposition and autodeposition, styrene acrylic, vinyl toluene acrylic, radiation-curable acrylic, melamine, urea, epoxy (diglycidyl ether of bisphenol A, bisphenol F, cycloaliphatic, monofunctional epoxies and the like), vinyl acetate copolymer N-methylolacrylamide, vinyl acetate-ethylene, vinyl acetate terpolymer, vinyl acetate-vinyl versatate, polyvinyl chloride, polyvinylidene chloride, ethylene-acrylic acid, ethylene-methacrylic acid, ionomer, ethylene-methyl acrylate, cellulosics, nitrocellulose, cellulose acetate butyrate, shellac, phenolic, ethyl silicate, polyacetals, styrene-allyl alcohol, chlorinated rubber, polyvinyl alcohol, butyl rubber, styrene-ethylene butylene-styrene block copolymer rubber, urethane acrylate, polyamideimide, polyesterimide, silicones, silanes, shellac, polyamides, polytetrafluoroethylene, polydiallyldimethylammonium chloride, polyphenylene sulfide, aromatic polyester, polyimide, siliconeimide, fluoropolymers, parylene, aramid, stelarate polymers, oleoresinous, and chlorinated polyolefin and bis-cyclobenzobutene.

As used herein, an "elastomeric prepaint" refers to a prepaint which includes flexible binders. An elastomeric prepaint may be used to make elastomeric coatings of different quality, flexibility, mildew protection, and substrate adhesion suitable for either application on wall or roofs for example. Two features that distinguish elastomeric coatings from typical architectural coatings may be the use of binders with low temperature (<0° C.) flexibility and the thickness at which the coating are applied (typically a dry coating thickness of about 6 to about 20 mil for wall applications and about 15 to about 40 mil for roof applications). Low temperature flexibility is desirable for elastomeric coatings when they are being used over walls that may develop cracks, such as masonry walls, or roofing substrates that have a high degree of dimensional variance with climate. In addition to coating flexibility, it is desirable to have an elastomeric coating line with different degrees of low temperature flexibility, different qualities, the ability to adhere to different substrates, and variations in appearance.

As used herein, a "fire retardant prepaint" refers to a prepaint which includes fire retardant(s) that reduce flammability, resist ignition, and/or retard the spread of flame.

As used herein, an "additive" refers to any substance that enhances the application, final performance properties, and/or appearance of the paint and/or base paint. Suitable additives include an acid, a base, a defoamer, a coalescent, a cosolvent, a mildewcide, a biocide, an antifreeze agent, a flash rust inhibitor, an aggregate, a crosslinker, a reactive pigment, a colorant, any combination of the foregoing, and/or the like.

As used herein, a "defoamer" refers to additives used to reduce or eliminate foam formed in a paint, base paint, or prepaint. Suitable defoamers include silicone-based defoamers, mineral oil-based defoamers, and the like.

As used herein, a "coalescent" refers to additives with a high boiling point, which when added to a base paint, aids in film formation via temporary plasticization (softening) of the vehicle. If a coalescent is required, it may be incorporated in the binder or dilutant prepaints for example. Suitable coalescents, plasticizers, and other optional solvents include ethylene glycol, propylene glycol, hexylene glycol, 2,2,4-trimethyl-1,3-pentanediol monoisobutyrate (TEXANOL™), glycol ethers, mineral spirits, methyl carbitol, butyl carbitol, phthalates, adipates, and the like.

As used herein, a "surfactant" refers to additives which reduce surface tension and may form micelles and thereby improve wetting. Surfactants may also help to disperse pigments, inhibit foam, and/or emulsify. Suitable surfactants include cationic, anionic, nonionic, or amphoteric surfactants.

As used herein, a "cosolvent" refers to additives which prevent freezing, slow down drying rates, aid in coalescence, help wet substrates, and fine-tune the rheology of base paints or prepaints thickened with associative thickeners.

As used herein, a "mildewcide" refers to additives which destroy, retard, or prevent the growth of mildews, and a "biocide" refers to additives capable of destroying, retarding, or preventing the growth of organisms responsible for microbiological degradation. Suitable mildewcides and biocides include zinc oxide, isothiazolones, triazoles, and the like.

As used herein, an "antifreeze agent" refers to additives which prevent freezing.

As used herein, a "flash rust inhibitor" refers to additives which inhibit corrosion that occurs during the drying process of aqueous paint or base paint and/or inhibit the corrosion of the reservoir they are contained in. Suitable flash rust inhibitors include aminoethylethanol amine, ammonium benzoate, sodium nitrite, ammonia benzoate, ammonium and amine salts of dicarboxylic acids and diphenols, such as glutaric acid, malonic acid, suberic acid, sebacic acid, adipic acid, succinic acid, phthalic acid, isophthalic acid, terephthalic acid, thidiphenol and sulfonyldiphenol and their ammonium and amine-complexed zinc salts, C-12 to C-14-tert-alkylamines, compounds with (2-benzothiazolythio)-butanedioic acid; (2-benzothiazolyltio) butanedioic acid, 4-oxo-4-p-tolylbutryic acid adduct with 4-ethylmorpholine, zirconium complex with 4-methyl-.delta.-oxo-benzene-butanoic acid and the like.

As used herein, an "aggregate" refers to inert granular materials. Suitable aggregates include small (typically 40 mesh and higher), intermediate (typically 20-40 mesh) and large (typically 20 mesh and lower) aggregates, such as sand, large particle size carbonates (limestone), ceramics, glass, fibers, coal, granite, talc, multicolored quartz, crushed sea shells, recycled products such as asphalt-containing materials, fiberglass, vermiculite, perlite, XO aggregate, and the like.

As used herein, a "crosslinker" refers to additives which will react chemically with the molecular chains of a thermoplastic material, and by linking them together create a more rigid structure resulting in a more or less infusible product. Suitable crosslinkers include multivalent metal ions, such as zinc, magnesium, zirconium, calcium, and the like ions.

As used herein, a "reactive pigment" refers to a material that is added to coating formulations to confer corrosion resistance by sacrificially corroding on behalf the substrate. Suitable reactive pigments include calcium zinc phosphomolydate, zinc phosphate, aluminum triphosphate, strontium zinc phosphosilicate, molybdate-modified zinc phosphate, and the like.

Detailed Description.

As discussed above, the present invention may be readily adapted to a variety of prepaints for consistently producing an aqueous base paint having any end-use application characteristic. Generally, a prepaint may be any one of any number of prepaints. For example, a prepaint may be one of seven prepaints including a pigment prepaint, a dilutant prepaint, an extender prepaint, a high resin content binder prepaint, a low resin content binder prepaint, an elastomeric prepaint, and a fire retardant prepaint.

To formulate prepaints, one needs to consider the range of key properties required by the complete paint line and formulate a set of prepaints which are capable of being blended in various combinations to cover the key properties required for the particular paint line. The number of prepaints required will depend on how flexible the final matrix of paint needs to be. Specific properties may be improved by adding paint additives which enhance the desired property.

In some embodiments of the present invention, the aqueous prepaints may be sufficiently stable to be selectively utilized at the point of sale and/or use to generate an aqueous base paint having the desired end-use application characteristics. Stability relates to how chemicals respond when mixed together and under high speed dispersion. How chemicals are added, along with unique individual formulas, keep these embodiments of prepaints stable and in solution remaining homogeneous, allowing for highly accurate quality control. Thus, multiple base paints may be formed consistently on demand from these stable prepaints at the point of sale and/or use through the selective combination of the prepaints in accordance with prepaint ratios associated with each of the other base paints.

Pigment Prepaint.

The pigment prepaint gives the base paint it helps to form all the substances that the base paint will need to form properly and to balance the base paint's properties so that the finished product is a base paint. The pigment prepaint may react to thickeners in other prepaints, change the performance of the base paint, aid in the base paints weatherability, and aid in the enhancement of the viscosity of the base paint. The percentage by weight and type of pigments in the pigment prepaint determines the sheen of the paint. A pigment prepaint may comprise: a pigment such as titanium dioxide ($TiO_2$); water; an extender; and a binder.

To increase the stability of the pigment prepaint, a dispersant-thickener may be added to the pigment prepaint composition. Accordingly, in such a scenario, the pigment prepaint may contain a pigment such as $TiO_2$ finely ground. The ground $TiO_2$ is a commercially available product used in a wide variety of paints and its preparation techniques are well-known in the industry. The percent by weight of $TiO_2$ in each product formulation is in direct correlation to the tinting bases and strengths desired. The whiter the product, the greater the levels. The greater the demand for colorant, the lesser the amount of $TiO_2$ because it counteracts the ability to properly achieve the color desired.

The $TiO_2$ may be added to water. During the blending process, an extender, such as aluminum silicate, clay (e.g. ASP170), and/or a mixture of clay and silica, may be ground like the pigment and may be added to maintain the $TiO_2$ in suspension. The extender provides the flexibility of using less of the pigment, and enhances the sheen of the resultant base paint as well as provides for in can stabilization.

The key to good pigment dispersion is to have the $TiO_2$ molecules spaced out properly. $TiO_2$ is a large particle and tends to be difficult to suspend in an aqueous solution because of its molecular weight. Accordingly, both the extender and the $TiO_2$ may be encapsulated in a binder, such as acrylic, which gives the pigment prepaint the ability to accept colorant, as well as rendering it more tolerable to staying in solution without flocculating or settling to the bottom of the solution causing a difference in density, which would make the final base paint inconsistent. The addition of binder has been found to aid in reducing the time for the resultant paint to cure. This factor is useful but tends to reduce the storage time of the pigment prepaint and is utilized only when a reduced curing time is important to the operator.

To further maintain the titanium dioxide in a uniform dispersion, a dispersant-thickener may be added during blending. For example, it has been found that the combination of a primary dispersant supplemented by the addition of a phosphate-based dispersant along with a modest amount of thickener enables the pigment dispersion to remain uniform in distribution while stored. The commercially available dispersant sold as BUSPERSE (a federally registered trademark owned by Buckman Laboratories, Inc.) and manufactured by Buckman Laboratories, Inc. is one example of a primary dispersant that may be added. In addition, the phosphate based dispersant potassium tri poly phosphate (KTPP) may be added. It is believed that the phosphate ions in this additive replace the carbonate and other ions in the water to enhance the wetting properties of the water and thereby promote the distribution of the titanium dioxide throughout.

The thickener added may be a HASE thickener, a HEUR thickener, and/or a cellulosic thickener. Several are commercially available for use in the manufacture of aqueous paint prepaints. One example is the thickener sold under the trademark 481 by AKZO NOBEL (Sweden). The HASE, HEUR, and/or cellulosic thickeners do not add to the ultimate paint film (the build or application characteristics) as one would expect them to do in paint. Rather, through hydrogen bonding principles, they allow for longer in solution stability of the pigment prepaint.

By way of further explanation, the HASE thickener is a carbohydrate technology that relies on polysaccharide, which is made solely from glucose units. The HEUR thickener is a ethylene oxide-urethane polymer. Both the HASE thickener and the HEUR thickener are used to stabilize the pigment prepaint and achieve the desired thickness (change the viscosity) by targeting specific aspects of the hydrogen elements found throughout the solution and using specific hydrogen bonding reactions and associations with the acrylic in the pigment prepaint as triggered by the ph of the pigment prepaint.

The combination of the foregoing components helps the pigment prepaint to stay in suspension longer, leading to finished base paints that may be duplicated time and again at the point of sale and/or use.

Dilutant Prepaint.

The second prepaint in terms of likely usage is a dispersant-thickening prepaint which serves as a dilutant. The dilutant prepaint may be used in formulating all base paints with the exception of a high gloss finish base paint. The dilutant prepaint has a high water content and contains certain thickeners that react to both the water and methacrylates found in the binder prepaints. It is used to dilute the concentration of the finished base paint and to also maintain a certain viscosity, provide a rich texture, and aid in the film forming properties desired for the finished base paint. A dilutant prepaint may comprise: water; and a HEUR thickener.

To increase the stability of the dilutant prepaint, phosphate-based dispersant, HASE and/or cellulosic thickeners, and a coalescent may be added to the dilutant prepaint composition. Accordingly, in such a scenario, the dilutant prepaint may be predominantly water. A phosphate-based dispersant such as KTPP may be added. The phosphate-based dispersant may be added along with a HASE thickener, a HEUR thickener, and/or a cellulosic thickener. The combination of dispersant and thickener acts in the same manner as in the pigment prepaint although it is to be noted that the amount of thickener is several times that used in the pigment prepaint. An additional ingredient may be a coalescent. One commercial coalescent found suitable for use is sold under the federally registered trademark TEXANOL by Eastman Kodak Company.

The combination of the foregoing components helps the dilutant prepaint to stay in suspension longer, leading to finished base paints that may be duplicated time and again at the point of sale and/or use.

Extender Prepaint.

The third prepaint may be an extender prepaint. The extender prepaint may include clay and silica's that allows for the reduction of the pigment prepaint. The extender prepaint directly affects the sheen of the base paint and may be in most of the base paint formulations. An extender prepaint may comprise: water; a HEUR thickener; a coalescent; a surfactant; a binder; a clay; and a silica.

To increase the stability of the extender prepaint, phosphate-based dispersant and HASE and/or cellulosic thickeners may be added to the extender prepaint composition. Accordingly, in such a scenario, the extender prepaint may comprise water. The phosphate-based dispersant such as KTPP may be included. The phosphate-based dispersant may be added along with a HASE thickener, a HEUR thickener, and/or a cellulosic thickener. The combination of dispersant and thickener acts in the same manner as in the pigment and dilutant prepaints. A coalescent may also be included. A surfactant may be included. A binder, such as acrylic, may also be included. A clay, such as ASP170, may be included. A silica, such as aluminum silicate, may also be included.

The combination of the foregoing components helps the extender prepaint to stay in suspension longer, leading to finished base paints that may be duplicated time and again at the point of sale and/or use.

Binder Prepaints.

The binder prepaints give the base paint staying power on a wall for example and provides the base paint with scrub resistance so that it is durable and enhances the long lasting effects of the base paint. The amount of binder prepaint directly affects the life expectancy of the base paint. It is difficult to formulate a stable base paint when using latex polymeric binders because of latex instability. Such polymers are very sensitive to the solvents and surface active agents commonly found in paint formulations, such as surfactants, dispersants, rheology modifiers, and co-solvents. Latex polymeric binders contain the polymeric material in particles that are insoluble in water. These particles often require modifications to render them stable when supplied in an aqueous medium. If the modification is inadequate, the latex particles attach to one another forming a coagulated mass which then separates out of the latex base paint. Paint formulating with a latex system is very difficult because the surface active materials in the formulation disrupt the delicate balance of surface forces that stabilize the latex particles in a water medium.

A high resin content binder prepaint may comprise: water; binder; diatomaceous earth; a combination of ground limestone and calcined clay; a HEUR thickener; and a coalescent. A low resin content binder prepaint may comprise: water; binder; a HEUR thickener; and a coalescent.

To increase the stability of the high and low resin content binder prepaints, a phosphate-based dispersant and HASE and/or cellulosic thickeners may be added to the prepaint compositions. Accordingly, in such a scenario, the high resin content binder prepaint may contain water and binder. The binder utilized may be a 100 percent acrylic acrynol resin, such as the resin sold under the trademark 6183 by BASF. However, it is to be noted that other binders may be used if desired. The amount of binder and water in the high resin content binder prepaint may be varied to achieve different finish characteristics. Also included may be the phosphate-based dispersant such as KTPP, and the HASE thickener, the HEUR thickener, and/or the cellulosic thickener to promote the same long shelf life characteristic of the foregoing prepaints. A coalescent may also be included.

The low resin content binder prepaint may include binder and water. The binder utilized may be polyvinyl acetate (PVA). However, it is to be noted that other binders may be used if desired. The amount of binder and water in the low resin content binder prepaints may be varied to achieve different finish characteristics. To this mixture of binder and water may be added diatomaceous earth as a flattening agent and a combination of ground limestone and calcined clay. The combination of a phosphate-based dispersant such as KTPP and a HASE thickener, a HEUR thickener, and/or a cellulosic thickener may also be added to promote the same long shelf life characteristic of the foregoing prepaints. A coalescent may also be added.

The combination of the foregoing components helps the high and low resin content binder prepaints to stay in suspension longer, leading to finished base paints that may be duplicated time and again at the point of sale and/or use.

Other Prepaints.

In other embodiments of the invention, any number of other aqueous prepaints, in addition to the five aqueous prepaints previously discussed, may be provided to further maximize the flexibility of base paint production. These other aqueous prepaints may also be sufficiently stable to be utilized at the point of sale and/or use to generate a base paint having the desired end-use application characteristics. For the exemplary purposes of this disclosure, two additional aqueous prepaints may be included, namely a elastomeric prepaint and a fire retardant prepaint.

Formulating Base Paints.

Formulating base paints is complex—it is not simply a matter of mixing a few paint ingredients in different ratios. Rather, base paint formulating involves the process of selecting and admixing appropriate paint ingredients in the correct proportions to provide a base paint with specific processing and handling properties, as well as a final dry paint film with the desired properties. Possible ingredients of latex base paint formulations according to the present invention may include, but are not limited to, a binder, a pigment, an extender, and/or a dilutant. Common optional additives include, but are not limited to, coalescents, thickeners, surfactants, and/or dispersants.

The sheen (e.g. flat, eggshell, satin, semi-gloss, or gloss) may be determined by the volume of the binder(s), pigment(s), and extender(s) in the base paint formulation, as well as the type of binder(s), pigment(s) and extender(s) in the base paint formulation. In addition to the various sheens, base paints may be formulated to be untinted or tinted to a wide variety of colors using different tint bases, including white base, pastel or light tone base, medium or mid-tone base, or deep base. Also, base paints may be formulated for exterior or interior use. Furthermore, base paints may be formulated to provide certain quality performance properties, e.g., basic, improved, premium, and platinum.

The foregoing ingredients and end-use application characteristics may be found in or provided by the set of aqueous prepaints of the present invention previously described. That is, the foregoing paint ingredients may be combined in the various prepaints and the base paints formed from the prepaints may provide the properties characteristic of the amount of ingredient used.

Prepaints are selected so that they cover a wide formulation space so that the desired final paint properties lie within the blend space defined by the prepaints at the extremes. In many cases the prepaints themselves will not be practical paints. But, by pushing the prepaints to these extremes one can maximize the blend space available for the set. When the prepaints and additives are all fully compatible, they can be blended at desired ratios to achieve desired paint line(s) and range of paints without inducing colloidal instability. It is possible to make a specific paint in the paint line without utilizing each of the prepaints available in the set of prepaints.

Through empirical methods, it has been determine which blends of prepaints are needed for specific paint lines. The pigment prepaint may be added up to around 65 percent of a base paint formula. The dilutant prepaint may be added up to about 50 percent of a base paint formula. The extender prepaint may be added. The high resin content binder prepaint may also be added. The low resin content binder prepaint may be added. The elastomeric prepaint may be added. The fire retardant prepaint may also be added.

Then, to produce a desired base paint and as will be described in greater detail hereinafter, every formula or recipe for every base paint may then be entered into a database of a paint production apparatus to achieve 100% reproducible results on a single product order basis. Each aqueous prepaint may be contained in a separate storage reservoir that may be coupled through fluid pumps and appropriate valving to dispensing outlets with the discharge therefrom being directed into a point of sale and/or use container for example.

It will be obvious to a person of ordinary skill in the art that not all of the aqueous prepaints need to be used to produce every base paint. For example, only two prepaints are required to make particular types of base paint. While many base paints require pigment prepaint, some base paints may be made without a pigment prepaint.

Furthermore, it will be obvious to a person of ordinary skill in the art that the prepaints may be varied to produce varying quality levels, not just high, to produce base paints that are suitable for either interior or exterior use, and to produce base paints having various tint bases so that they are suitable for use in forming different types of colored paints. An interior base paint may have less of the high resin content binder and/or low resin content binder prepaints than a comparable exterior base paint. Quality may be increased by decreasing the amount of dilutant and/or extender prepaints in a base paint and increasing the amounts of the pigment prepaint and the low and high resin content binder prepaints. The amount of pigment prepaint may be varied to change the type of color for which the base paint is well-suited. Generally, pastel or light tone base requires more pigment prepaint than white base, medium or mid-tone base requires more pigment prepaint than pastel or light tone base, and deep base requires more pigment prepaint than medium or mid-tone base. The actual balances between the aqueous prepaints for the different base paints may be varied in accordance with the needs of the purchaser for a particular type of base paint. For example, a particular purchaser may require a base paint that will have greater coverage. In addition, colorants may be added to vary the color of the base paint.

The following examples further illustrate, not limit, the invention.

EXAMPLE 1

In general and for the exemplary purposes of this disclosure, an interior base paint of platinum (i.e. high) quality may utilize the indicated prepaints for the sheens shown below:

|  | Pigment | Dilutant | Extender | High Resin | Low Resin |
| --- | --- | --- | --- | --- | --- |
| Flat | + | + | + | − | + |
| Eggshell | + | + | + | − | + |
| Satin | + | + | + | + | + |
| Semi-Gloss | + | + | − | + | − |
| High-Gloss | + | + | − | + | − |

In general and for the exemplary purposes of this disclosure, an interior base paint of only pro (i.e. low) quality may utilize the indicated prepaints for the sheens shown below:

|  | Pigment | Dilutant | Extender | High Resin | Low Resin |
| --- | --- | --- | --- | --- | --- |
| Flat | + | + | + | − | + |
| Eggshell | + | + | + | − | + |
| Satin | + | + | + | − | + |
| Semi-Gloss | + | + | − | + | + |
| High-Gloss | + | + | − | + | + |

EXAMPLE 2

In general and for the exemplary purposes of this disclosure, an exterior base paint of platinum quality may utilize the indicated prepaints for the sheens shown below:

|  | Pigment | Dilutant | Extender | High Resin | Low Resin |
| --- | --- | --- | --- | --- | --- |
| Flat | + | + | + | + | − |
| Eggshell | + | + | + | + | + |
| Satin | + | + | + | + | + |
| Semi-Gloss | + | + | − | + | − |
| High-Gloss | + | + | − | + | − |

In general and for the exemplary purposes of this disclosure, an exterior base paint of only pro quality may utilize the indicated prepaints for the sheens shown below:

|  | Pigment | Dilutant | Extender | High Resin | Low Resin |
| --- | --- | --- | --- | --- | --- |
| Flat | + | + | + | − | + |
| Eggshell | + | + | + | − | + |
| Satin | + | + | + | + | + |
| Semi-Gloss | + | + | + | + | − |
| High-Gloss | + | + | + | + | − |

EXAMPLE 3

For the exemplary purposes of this disclosure, depending upon the quality (e.g., pro, premium, or platinum) and base tint (e.g., white base, pastel or light tone base, medium or mid-tone base, or deep base), retail base paints suitable for interior use and for dispensing at the point of sale and/or use may include the aqueous prepaints in the pound per gallon ratio ranges shown below:

|  | Pigment | Dilutant | Extender | High Resin | Low Resin |
| --- | --- | --- | --- | --- | --- |
| Flat | 0.00-4.17 | 0.00-3.45 | 4.00-7.00 | 0.00 | 0.55-3.00 |
| Eggshell | 0.00-5.95 | 1.00-3.40 | 0.50-2.05 | 0.00 | 3.10-4.05 |
| Satin | 0.00-5.10 | 0.00-1.90 | 0.75-2.50 | 0.00-4.00 | 1.00-4.60 |
| Semi-Gloss | 0.00-4.90 | 0.00-2.80 | 0.00 | 0.40-5.80 | 0.00-5.75 |
| High-Gloss | 0.00-4.31 | 0.00-1.91 | 0.00 | 0.65-6.00 | 0.00-5.35 |

EXAMPLE 4

For the exemplary purposes of this disclosure, depending upon the quality (e.g., pro, premium, or platinum) and base tint (e.g., white base, pastel or light tone base, medium or mid-tone base, or deep base), retail base paints suitable for exterior use and for dispensing at the point of sale and/or use may include the aqueous prepaints in the pound per gallon ratio ranges shown below:

|  | Pigment | Dilutant | Extender | High Resin | Low Resin |
| --- | --- | --- | --- | --- | --- |
| Flat | 0.00-4.65 | 0.00-2.25 | 3.20-5.60 | 0.00-4.00 | 0.00-3.00 |
| Eggshell | 0.00-5.95 | 1.00-3.40 | 0.50-2.05 | 0.50-0.65 | 2.65-3.40 |
| Satin | 0.00-5.10 | 0.00-1.9 | 0.75-2.50 | 0.50-4.00 | 1.00-4.60 |

-continued

|  | Pigment | Dilutant | Extender | High Resin | Low Resin |
|---|---|---|---|---|---|
| Semi-Gloss | 0.00-4.73 | 0.00-2.80 | 0.00 | 0.40-5.80 | 0.00-5.75 |
| High-Gloss | 0.00-4.31 | 0.00-1.73 | 0.00 | 5.90-6.06 | 0.00 |

Paint Production Apparatus.

A common apparatus for producing different types of aqueous base paints from a limited set of prepaints according to the present invention will now be described. Although the invention may be readily adapted to a variety of embodiments of a common apparatus for producing different types of aqueous base paints from a plurality of prepaints, with reference to FIGS. 1-5, apparatus 10 is an example of a common apparatus for producing aqueous base paints from a plurality of prepaints of the invention. Apparatus 10 may be adapted for both large-scale and small-scale paint manufacture, as well as paint manufacture at a retail point of sale or a point of use. Apparatus 10 may be used to minimize the number of paint ingredients needed in a paint manufacturer's inventory, and/or to minimize the number of different paint types and retail floor space needed by a vendor selling a full line of paint products for example.

Referring to FIG. 1, apparatus 10 includes five tanks that act as supply or storage reservoirs 12, 14, 16, 18, 20 for the pigment, dilutant, extender, and the two binder aqueous prepaints described above. The aqueous prepaints may be stored in supply reservoirs 12, 14, 16, 18, 20 for a significant period of time. For example, the reservoirs 12, 14, 16, 18, 20 may be able to store the aqueous prepaints for at least one day, at least a week, at least two and one half months, or at least two years. The desired amount of any of the five prepaints is supplied to a bucket that acts as a receiving reservoir 22 for the desired aqueous base paint. Receiving reservoir 22 may be contained within the same container that will ultimately house the base paint.

First Reservoir 12, second reservoir 14, third reservoir 16, fourth reservoir 18, and fifth reservoir 20 may be large tanks that will contain enough of the five prepaints to last for a substantial period of time. For the exemplary purposes of this disclosure, first reservoir 12, second reservoir 14, third reservoir 16, fourth reservoir 18, and fifth reservoir 20 are each a 275 gallon polymer container. However, reservoirs 12, 14, 16, 18, 20 may be any of several other containers that are suitable for holding aqueous prepaints.

First reservoir 12, second reservoir 14, third reservoir 16, fourth reservoir 18, and, and fifth reservoir 20 are fluidly connected to first pump 30, second pump 32, third pump 34, fourth pump 36, and fifth pump 38 respectively. For the exemplary purposes of this disclosure, first pump 30, second pump 32, third pump 34, fourth pump 36, and fifth pump 38 may be ¾ inch rotary gear pumps available under the model number 1V426 from W. W. Grainger, Inc. A first motor 40, second motor 42, third motor 44, fourth motor 46, and a fifth motor 48 power first pump 30, second pump 32, third pump 34, fourth pump 36, and fifth pump 38, respectively. For the exemplary purposes of this disclosure, motors 40, 42, 44, 46, 48 may be 0.75 horsepower electric motors model number 4K858AA available from W. W. Grainger, Inc. For the exemplary purposes of this disclosure, motors 40, 42, 44, 46, 48 may be mechanically connected to pumps 30, 32, 34, 36, 38 respectively by a drive belt and pulley assembly or other suitable mechanical drive connection. However, pumps 30, 32, 34, 36, 38 may be other types of pumps and they may be powered in some other way. Also, other types of fluid transmitting systems, such as gravity feed systems may be used.

First pump 30, second pump 32, third pump 34, fourth pump 36, and fifth pump 38 are fluidly connected to first valve 50, second valve 52, third valve 54, fourth valve 56, and fifth valve 58 respectively. First valve 50, second valve 52, third valve 54, fourth valve 56, and fifth valve 58 may be actuated by an actuator system that may include a first solenoid 60, second solenoid 62, third solenoid 64, a fourth solenoid 66, and a fifth solenoid 68. Each solenoid 60, 62, 64, 66, 68 may be a pneumatic, electric, hydraulic, magnetic, or the like solenoid that actuates a corresponding valve 50, 52, 54, 56, 58. For the exemplary purposes of this disclosure, each solenoid-valve combination is the solenoid-valve combination available under the model number VE075 from Rain for Rent. However, those skilled in the art will appreciate that the valves 50, 52, 54, 56, 58 may be a single five-way valve, and that solenoids 60, 62, 64, 66, 68 may be a five-way actuator that is able to actuate valves 50, 52, 54, 56, 58. Valves 50, 52, 54, 56, 58 are fluidly connected to receiving reservoir 22. For the exemplary purposes of this disclosure, valves 50, 52, 54, 56, 58 are positioned above receiving reservoir 22 so that fluids passing through valves 50, 52, 54, 56, 58 drop directly into receiving reservoir 22 (see FIG. 2).

For the exemplary purposes of this disclosure, the fluid lines connecting the various components of apparatus 10 may be 0.75 inch inside diameter flexible polyvinyl chloride (PVC) lines. However, the fluid lines may be any of various lines that are sufficient to transfer fluids between reservoirs, pumps, and valves.

For the exemplary purposes of this disclosure, receiving reservoir 20 may be any paint bucket of any size that is suitable for containing paint when it is sold to a consumer. However, receiving reservoir 22 may be any type of container that may contain an aqueous base paint.

Prepaints may be dispensed gravimetrically or volumetrically. Accordingly, receiving reservoir 22 may be seated on a scale or measuring system 70 that is connected to and emits a signal to a control 80 that represents the weight of reservoir 22. For the exemplary purposes of this disclosure, scale 70 may be a model number CX 086 scale available from Aztech Controls Corp. in Mesa, Ariz. Alternatively, prepaints may be dispensed volumetrically. Accordingly, flowmeters or some other measuring system may be used to measure the flow amounts of each of the prepaints into receiving reservoir 22.

Control 80 may be a Personal Computer (PC) for example, rendering apparatus 10 a common automated computer controlled paint production apparatus, or control 80 may be an expandable programmable logic control (PLC) system comprising a central processing unit having a program with parameter settings that may coordinate and control any of or all the components and functions of apparatus 10. The PLC also may have associated therewith a local data storage device such as a local hard drive, random access memory (RAM), or other magnetic or electronic data storage medium. The local data storage device may be used for any number of data storage functions common to a processor, but is particularly useful for storing data necessary for the operation of apparatus 10, such as an operating system and application software. For example, control 80 may be the PLC system available from Quantum Automation in Tustin, Calif. that includes a housing unit having model number D2-06B, which houses units having model numbers D2-250, D2-08ND3, and F2-04AD-1, and two units having the model number D2-08TR. The electrical position and function of each of these units will be described in more detail below.

Control device 80 may be directly or indirectly connected with any of or all the components of apparatus 10 in any number of communication connection configurations. Some examples of communications connections may include, without limitation, electronic or other data transferring cable (including optical as well as electrical), radio frequency wave transmissions including cellular frequency transmissions as well as microwave, satellite dish frequencies, etc., "Bluetooth" technology transmissions, and the like, such as is common with remote communication systems.

Notwithstanding, and for the exemplary purposes of this disclosure, control 80 is connected to and emits control signals to motors 40, 42, 44, 46, 48 to turn motors 40, 42, 44, 46, 48 on and off. Control 80 is also connected to and emits control signals to solenoids 60, 62, 64, 66, 68 to prompt solenoids 60, 62, 64, 66, 68 to open and close valves 50, 52, 54, 56, 58.

Control 80 is connected to and emits signals to an operator interface. For the exemplary purposes of this disclosure, the operator interface may be a touch screen 90 to prompt a operator to input information. Additionally, touch screen 90 emits signals to control 80 that represent input from the operator. Touch screen 90 may be a model number DP-C320 touch screen available from Quantum Automation. However, any of several touch screens would be sufficient as touch screen 90.

An emergency stop switch 92 is connected to control 80 so that when stop switch 92 is activated, stop switch 92 emits a signal to control 80 that will cause control 80 to turn motors 40, 42, 44, 46, 48 off and to actuate solenoids 60, 62, 64, 66, 68 to close valves 50, 52, 54, 56, 58. Additionally, a receiving reservoir position indicator 94 is connected to control 80 so that when receiving reservoir 22 is not correctly positioned indicator 94 will send a signal to control 80 that, like the stop switch signal, will cause control 80 to turn motors 40, 42, 44, 46, 48 off and to actuate solenoids 60, 62, 64, 66, 68 to close valves 50, 52, 54, 56, 58.

Figure 2:
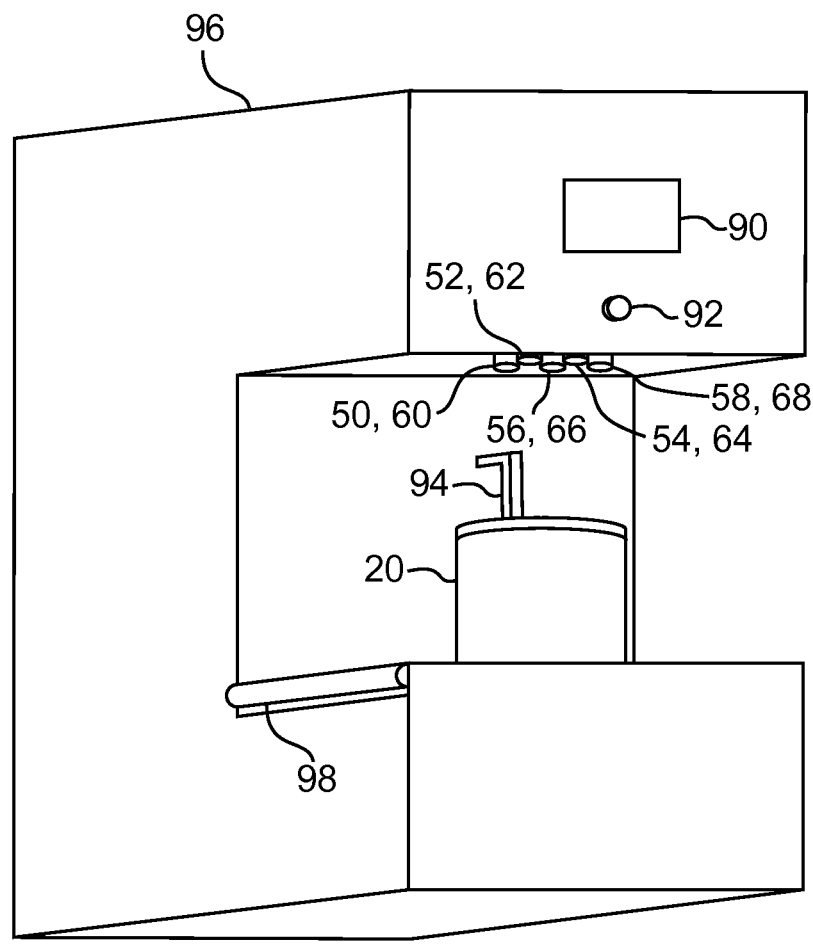
FIG. 2 is a perspective view of a portion of the apparatus of FIG. 1.

Referring to FIG. 2, emergency stop switch 92 is preferably activated and deactivated by a button located on the front of a frame 96 that houses valves 50, 52, 54, 56, 58; solenoids 60, 62, 64, 66, 68; scale 70 (not shown in FIG. 2); control 80 (not shown in FIG. 2); and touch screen 90. Preferably indicator 94 includes a lever that is depressed when receiving reservoir 22 is correctly positioned to receive aqueous prepaints from valves 50, 52, 54, 56, 58. Frame 96 preferably also houses a conveyor 98 that includes a series of rollers for easily moving buckets filled with aqueous solution away from valves 50, 52, 54, 56, 56 and scale 70.

Figure 3:
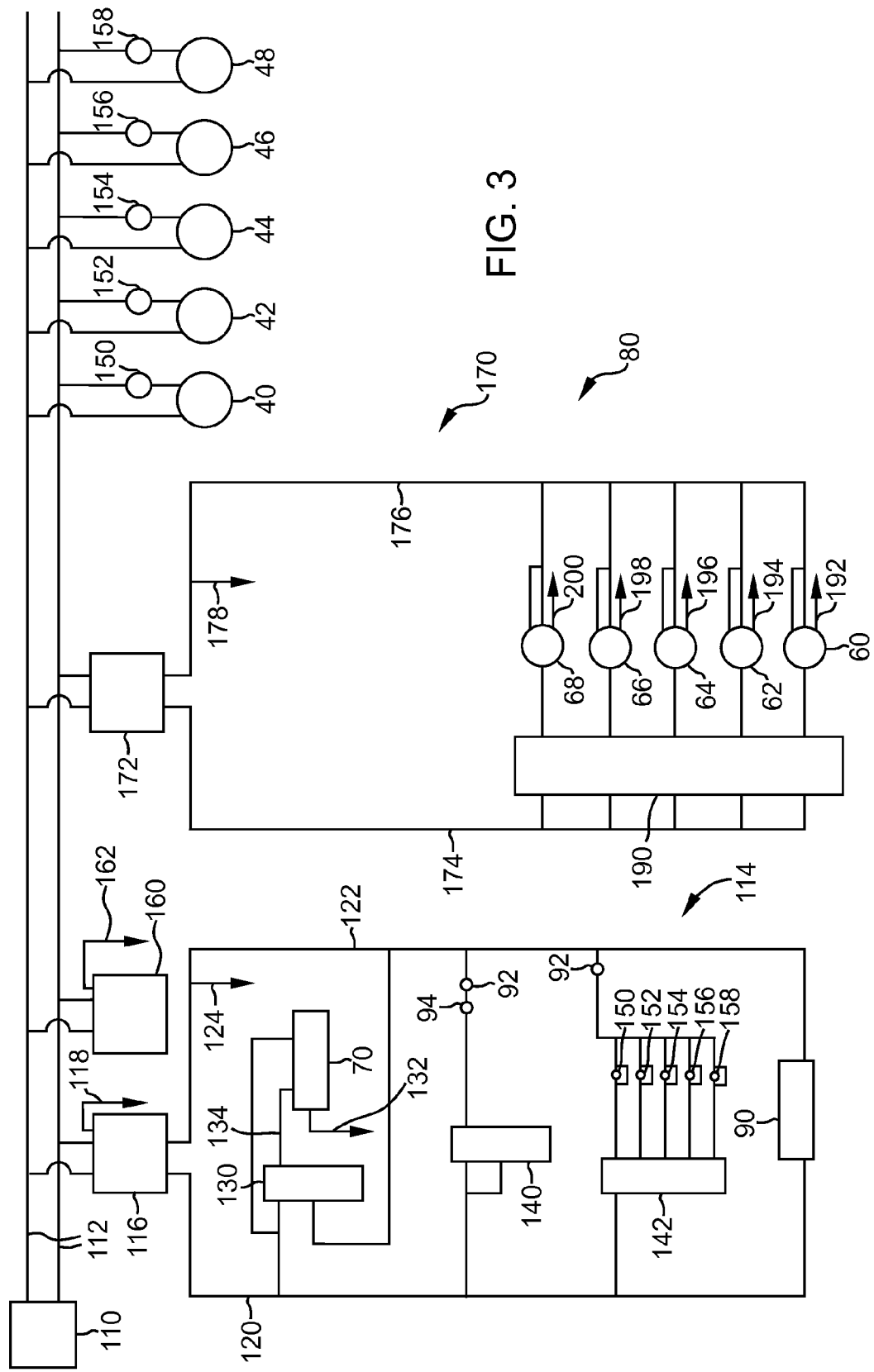
FIG. 3 is a schematic view of the circuitry of the apparatus of FIG. 1.

FIG. 3 depicts the circuitry for supplying electrical power to the various electrical components of apparatus 10. A power source 110 supplies 240 volt 60 Hertz AC electrical power to main power lines 112. A 24 volt DC circuit 114 includes a pair of lines extend from main power lines 112 to a 24 volt AC to DC converter 116. 24 volt converter 116 is grounded by a ground connection 118. A high voltage line 120 extends from 24 volt converter 116 that is at a positive 24 volts relative to ground. A low voltage line 122 extends from 24 volt converter 116 that is grounded by a ground connection 124.

A transducer unit 130 of control 80 is connected to high voltage line 120 and low voltage line 122. For the exemplary purposes of this disclosure, transducer unit 130 may be a four channel analog input having the model number F2-04AD-1 unit discussed above. Scale 70 is connected to high voltage line 120 and is grounded by a ground connection 132 to provide electrical power for scale 70. Also, an output line 134 extends from scale 70 to transducer unit 130 to carry a signal representing the weight of an object carried on scale 70.

A switch unit 140 of control 80 is connected to high voltage line 120 and is connected to low voltage line 122 via emergency stop switch 92 and position indicator 94 so that if either emergency stop switch 92 or position indicator 94 are open then power will cease being supplied to switch unit 140 and to the remainder of the PLC units. For the exemplary purposes of this disclosure, switch unit 140 may be the model number D2-08ND3 unit discussed above.

A motor control unit 142 is preferably connected to high voltage line 120. Motor control unit 142 includes four parallel connections to low voltage line 122, with each parallel connection extending via a motor switch. Thus, a first motor switch 150, a second motor switch 152, a third motor switch 154, a fourth motor switch 156, and a fifth motor switch 158 are arranged in parallel so that motor switches 150, 152, 154, 156, 158 are powered by 24 volt circuit 114. Emergency stop switch 92 is arranged in series with motor switches 150, 152, 154, 156, 158 in addition to being connected to switch unit 140 above to provide an additional safeguard and assure that motors 40, 42, 44, 46, 48 will be turned off if emergency stop switch 92 is activated. For the exemplary purposes of this disclosure, motor control unit 142 may be one of the model number D2-08TR units discussed above.

Touch screen 90 is connected to high voltage line 120 and low voltage line 122 to provide electrical power for touch screen 90.

A memory unit 160 is connected directly to each of the main power lines 112 and it is grounded by ground connection 162. Memory unit 160 includes the programmable memory that will embody control programming for control 80, including recipes for different base paints to be produced by apparatus 10. For the exemplary purposes of this disclosure, memory unit 160 may be the model number D2-250 unit discussed above.

A 12 volt DC circuit 170 includes a 12 volt AC to DC converter 172 that is connected to main power lines 112. A high voltage line 174 that is at 12 volts relative to ground extends from 12 volt converter 172. A low voltage line 176 extending from 12 volt converter 172 is grounded by a ground connection 178. A solenoid control unit 190 includes five parallel connections to high voltage line 174. Solenoid control unit 190 also includes five parallel connections to low voltage line 176, with each parallel connection extending via a solenoid. Thus, first solenoid 60, second solenoid 62, third solenoid 64, a fourth solenoid 66, and fifth solenoid 68 are arranged in parallel. Each solenoid 60, 62, 64, 66, 68 is grounded by a ground connection 192, 194, 196, 198, 200 respectively. For the exemplary purposes of this disclosure, each solenoid control unit may be one of the model number D2-08TR units discussed above.

First motor 40 is connected to main power lines 112 via first motor switch 150; second motor 42 is connected to main power lines 112 via second motor switch 152; third motor 44 is connected to main power lines 112 via third motor switch 154; fourth motor 46 is connected to main power lines 112 via fourth motor switch 156; and fifth motor 48 is connected to main power lines 112 via fifth motor switch 158. Thus, motor switches 150, 152, 154, 156, 158 receive power for actuation from 24 volt circuit 114, but when they are open they prohibit the AC circuits to motors 40, 42, 44, 46, 48 from being completed.

Paint Production Apparatus Operation and Use.

The operation and use of apparatus 10 will now be described with reference to FIGS. 1-4. It is to be understood that the various prompts made by touch screen 90 are activated by control 80, which sends signals to touch screen 90 and receives signals from touch screen 90. When apparatus 10 is not in operation, it is in a dormant state 210, wherein power is being supplied to various components, but none of them are functioning. In dormant state 210, touch screen 90 typically shows a logo or some other nonfunctional graphic. A operator may activate apparatus 10 by touching touch screen 90, whereupon touch screen 90 shows a number/attribute prompt 212, which prompts a operator to select either selection by recipe number 214 or selection by attribute 216. For the exemplary purposes of this disclosure, at any point in the process described below, the operator may select a main menu option to return to number/attribute prompt 212.

In the memory of memory unit 160, each valid recipe of the system, including the predetermined amounts of each of the five aqueous prepaints, corresponds to a recipe number. If the operator knows the recipe number for the desired recipe, then the operator should select selection by recipe number 214. If the operator selects selection by recipe number 214 by touching an appropriate area of touch screen 90, then a recipe number prompt 218 prompts the operator to enter a recipe number. The operator will then enter the number corresponding to the desired base paint recipe by touching appropriate areas of touch screen 90. After the operator has entered the number, the screen will show that the recipe number is either valid or invalid at 220. If the recipe is invalid, the operator may enter another recipe number.

After entering a valid recipe number, the operator may choose to verify stock availability 230 by touching an appropriate area of touch screen 90. If the operator chooses to verify stock availability 230, touch screen 90 will prompt the operator to enter a quantity 232. Touch screen 90 will then show whether the available amounts of the five aqueous prepaints in reservoirs 12, 14, 16, 18, 20 is sufficient or insufficient 234 to make the desired amount of the desired recipe.

Control 80 tracks the available amounts of each type of aqueous prepaint by subtracting the amounts of the aqueous prepaints as they are supplied from reservoirs 12, 14, 16, 18, 20. If reservoirs 12, 14, 16, 18, 20 are physically refilled, then the amount in supply reservoirs 12, 14, 16, 18, 20 may be reset as described below with reference to FIG. 5. After the amounts are reset, control 80 will again subtract amounts of the prepaints as they are used. To determine whether availability is sufficient for a particular quantity 232 of a particular recipe, control 80 is programmed to subtract the necessary amount of each prepaint needed for the recipe from the current amount in the corresponding reservoir 12, 14, 16, 18, 20. If the amount of any of the reservoirs 12, 14, 16, 18, 20 is less than zero after the subtraction, then the availability is insufficient. If the amount in all reservoirs 12, 14, 16, 18, 20 is zero or greater, then the amount is sufficient.

After either the operator chooses not to verify stock availability 230 or after the operator completes verifying stock availability 230, touch screen 90 prompts the operator to enter a quantity 240 of base paint to be made. The operator then selects the quantity 240. For the exemplary purposes of this disclosure, the operator may select either a quart for a quart paint bucket 22, a gallon for a gallon paint bucket 22, two gallons for a two gallon paint bucket 22, five gallons for a five gallon paint bucket 22, or 55 gallons for a 55 gallon paint bucket 22. The operator is then prompted to position the container 242 and to respond affirmatively that the container or receiving reservoir 22 has been positioned. The attributes for the paint prepaint selected by the operator are then displayed and the operator is prompted to select start. Apparatus 10 then proceeds to automatically fill 244 receiving reservoir 22 with the appropriate amounts of each aqueous prepaint to make the desired amount of the desired base paint according to the recipe.

Apparatus 10 will not proceed to supply prepaints to receiving reservoir 22 unless position indicator 94 is depressed by receiving reservoir 22, indicating that receiving reservoir 22 is properly positioned. If position indicator 94 is not depressed, then it will be in an open position and will not allow motors 40, 42, 44, 46, 48 to receive power. Also, if during the filling process, the position indicator is not depressed, then motors 40, 42, 44, 46, 48 will not receive power and apparatus 10 will cease supplying prepaints to receiving reservoir 22. This is done to assure that a receiving reservoir 22 is properly positioned to receive the prepaints. Likewise, if emergency stop switch 92 is depressed, then it will be in an open position and will not allow the circuits for motors 40, 42, 44, 46, 48 to be completed.

Referring now to FIG. 1, in filling receiving reservoir 22, control 80 first calibrates scale 70 to read zero with the receiving reservoir 22 seated on scale 70. Then, if a first prepaint is needed for the recipe, control 80 emits a signal to first solenoid 60 to open first valve 50 and a signal to first motor 40 to turn on, thereby powering first pump 30. First pump 30 pumps a first aqueous prepaint from first reservoir 12 through first valve 50 and into receiving reservoir 22. While receiving reservoir 22 is being filled, scale 70 is emitting a flow amount signal to control 80 indicating the flow amount or weight of the first aqueous prepaint that has been supplied to receiving reservoir 22. Once the predetermined amount of the first prepaint has been supplied to receiving reservoir 22, control 80 emits a signal to first solenoid 60 to close first valve 50 and a signal to first motor 40 to turn off. For the exemplary purposes of this disclosure, control 80 sends signals to first solenoid 60 and first motor 40 when scale 70 indicates that the amount of the first prepaint in receiving reservoir 22 is the desired amount of the first prepaint for the recipe minus an offset amount. The offset amount represents the amount of additional first prepaint that will be supplied to receiving reservoir 22 even after control 80 has sent the signals to first solenoid 60 and first motor 40.

After supply of the first prepaint is completed, scale 70 is again calibrated to zero. There may be a delay of two to three seconds after supply of the first prepaint is completed to allow scale 70 to be properly calibrated. Then, if a second prepaint is needed for the recipe, control 80 emits a signal to second solenoid 62 to open second valve 52 and a signal to second motor 42 to turn on, thereby powering second pump 32. Second pump 32 pumps the second aqueous prepaint from second reservoir 14 through second valve 52 and into receiving reservoir 22. While receiving reservoir 22 is being filled, scale 70 is emitting a flow amount signal to control 80 indicating the flow amount or weight of the second aqueous prepaint that has been supplied to receiving reservoir 22. Once the predetermined amount of the second prepaint has been supplied to receiving reservoir 22, control 80 emits a signal to second solenoid 62 to close second valve 52 and a signal to second motor 42 to turn off. For the exemplary purposes of this disclosure, control 80 sends the signals to second solenoid 62 and second motor 42 when scale 70 indicates that the amount of the second prepaint in receiving reservoir 22 is the desired amount of the second prepaint for the recipe minus an offset amount. As described above, the offset amount represents the amount of additional second prepaint that will be supplied to receiving reservoir 22 even after control 80 has sent the signals to second solenoid 62 and second motor 42 to turn off.

After supply of the second prepaint is completed, scale 70 is again calibrated to zero. Again, there may be a delay of two to three seconds after supply of the second prepaint is completed to allow scale 70 to be properly calibrated. Then, if a third prepaint is needed for the recipe, control 80 emits a signal to third solenoid 64 to open third valve 54 and a signal to third motor 44 to turn on, thereby powering third pump 34. Third pump 34 pumps the third aqueous prepaint from third reservoir 16 through third valve 54 and into receiving reservoir 22. While receiving reservoir 22 is being filled, scale 70 is emitting a flow amount signal to control 80 indicating the flow amount or weight of the third aqueous prepaint that has been supplied to receiving reservoir 22. Once the predetermined amount of the third prepaint has been supplied to receiving reservoir 22, control 80 emits a signal to third solenoid 64 to close third valve 54 and a signal to third motor 44 to turn off. For the exemplary purposes of this disclosure, control 80 preferably sends the signals to third solenoid 64 and third motor 44 when scale 70 indicates that the amount of the third prepaint in receiving reservoir 22 is the desired amount of the third prepaint for the recipe minus an offset amount. As described above, the offset amount represents the amount of additional third prepaint that will be supplied to receiving reservoir 22 even after control 80 has sent the signals to third solenoid 64 and third motor 44 to turn off.

After supply of the third prepaint is completed, scale 70 is again calibrated to zero. Again, there may be a delay of two to three seconds after supply of the third prepaint is completed to allow scale 70 to be properly calibrated. Then, if a fourth prepaint is needed for the recipe, control 80 emits a signal to fourth solenoid 66 to open fourth valve 56 and a signal to fourth motor 46 to turn on, thereby powering fourth pump 36. Fourth pump 36 pumps the fourth aqueous prepaint from fourth reservoir 18 through fourth valve 56 and into receiving reservoir 22. While receiving reservoir 22 is being filled, scale 70 is emitting a flow amount signal to control 80 indicating the flow amount or weight of the fourth aqueous prepaint that has been supplied to receiving reservoir 22. Once the predetermined amount of the fourth prepaint has been supplied to receiving reservoir 22, control 80 emits a signal to fourth solenoid 66 to close fourth valve 56 and a signal to fourth motor 46 to turn off. For the exemplary purposes of this disclosure, control 80 preferably sends the signals to fourth solenoid 66 and fourth motor 46 when scale 70 indicates that the amount of the fourth prepaint in receiving reservoir 22 is the desired amount of the fourth prepaint for the recipe minus an offset amount. As described above, the offset amount represents the amount of additional fourth prepaint that will be supplied to receiving reservoir 22 even after control 80 has sent the signals to fourth solenoid 66 and fourth motor 46 to turn off.

After supply of the fourth prepaint is completed, scale 70 is again calibrated to zero. Again, there may be a delay of two to three seconds after supply of the fourth prepaint is completed to allow scale 70 to be properly calibrated. Then, if a fifth prepaint is needed for the recipe, control 80 emits a signal to fifth solenoid 68 to open fifth valve 58 and a signal to fifth motor 48 to turn on, thereby powering fifth pump 38. Fifth pump 38 pumps the fifth aqueous prepaint from fifth reservoir 20 through fifth valve 58 and into receiving reservoir 22. While receiving reservoir 22 is being filled, scale 70 is emitting a flow amount signal to control 80 indicating the flow amount or weight of the fifth aqueous prepaint that has been supplied to receiving reservoir 22. Once the predetermined amount of the fifth prepaint has been supplied to receiving reservoir 22, control 80 emits a signal to fifth solenoid 68 to close fifth valve 58 and a signal to fifth motor 48 to turn off. For the exemplary purposes of this disclosure, control 80 preferably sends the signals to fifth solenoid 68 and fifth motor 48 when scale 70 indicates that the amount of the fifth prepaint in receiving reservoir 22 is the desired amount of the fifth prepaint for the recipe minus an offset amount. As described above, the offset amount represents the amount of additional fifth prepaint that will be supplied to receiving reservoir 22 even after control 80 has sent the signals to fifth solenoid 68 and fifth motor 48 to turn off.

Recalibrating scale 70 after each prepaint is placed in bucket 22 allows more accurate weight measurements to ensure that a correct amount of each prepaint is added to make the correct base paint (i.e. only the weight of that newly added prepaint is measured). On the contrary, recalibration has not been used for paint production in the past. Rather, conventional paint production makes paint on such a large scale by volumes in large machines rather than by weights in small cans or buckets.

After supply of the last prepaint desired is completed, receiving reservoir 22 may be removed and mixed for example. Because the base paint generated by the prepaints made from particular embodiments of the present invention are made fresh, there is less settling of the base paint. As a result, significantly less time is required to mix the base paint before delivering it to the customer. Where it typically takes three to four minutes to shake a can of paint that has been sitting on the shelf, base paint made fresh needs only about one to two minutes to shake it fully.

Moreover, a significant advantage of embodiments of the present invention relating to apparatus 10 is its ability to obtain small batch consistency. This is accomplished by many factors, including the foregoing process of determining quantities of materials by measuring the weights of the prepaint components added. In the past, it was required to make 250 to 500 gallons of a paint at one time. With the present invention, only a quart of paint may be made and later another quart of the same paint may be made later with exactly the same paint quality, consistency, characteristics and color. Also, if a customer wants 1 gal. 3 quarts, customers are no longer required to purchase 2 gallons or a 1 gallon can and 3 1-quart cans (at a higher price). The worker can use a single 2 gallon can and add only 1 gal. 3 quarts to the can.

Figure 4:
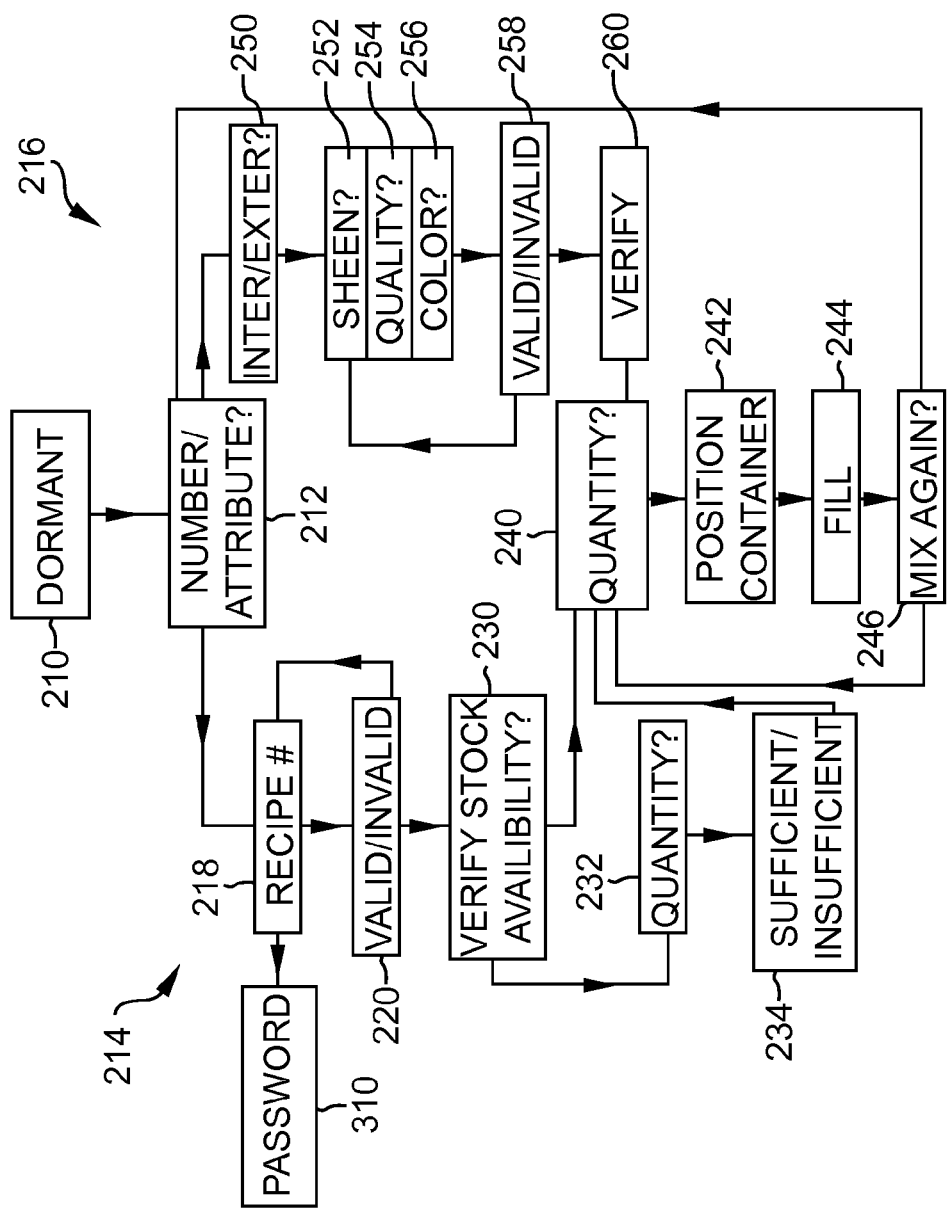
FIG. 4 is a flowchart depicting a method of producing a paint according to the present invention.

Referring now to FIG. 4, the operator will then be prompted to choose whether to mix again 246. If the operator chooses to mix again 246, the operator will be returned to the quantity prompt 240. In this way, if the operator wants to mix the same recipe, the operator will not be required to go through the entire selection process again. If the operator chooses not to mix again, then the operator is returned to number or attribute prompt 212.

Referring back to the number or attribute prompt 212, if the operator chooses to select a base paint by attribute 216, the operator will be prompted to make a series of selections regarding the attributes (i.e. end-use application characteristics) of the desired base paint. An interior or exterior prompt 250 prompts the operator to choose whether the base paint will be used for an interior use or for an exterior use. A sheen prompt 252 prompts the operator to select a sheen for the base paint. If the operator chooses interior use at prompt 250, then the choices at sheen prompt 252 may include flat, low sheen, egg shell, semi-gloss, and high gloss for the exemplary purposes of this disclosure. A quality prompt 254 prompts the operator to select a quality for the base paint. For the exemplary purposes of this disclosure, the choices at quality prompt 254 may include premium, improved, and basic. A color prompt 256 prompts the operator to select a base tint for the base paint. For the exemplary purposes of this disclosure, the choices at color prompt 256 may include white base, light base, mid-tone base, and deep base. For the exemplary purposes of this disclosure, sheen prompt 252, quality prompt 254, and color prompt 256 may all be displayed simultaneously on touch screen 90. Those skilled in the art will appreciate that the choices for sheen, quality, and color may include choices different than those described herein. Also, other prompts, such as a prompt for base paint coverage attributes, may be included.

The attribute prompt may be configured as a slider. An example of a slider is a graphical widget in a GUI with which a user may set a value by moving an indicator, usually in a horizontal fashion. In some cases the user may also click on a point on the slider to change the setting. A slider is any device which allows a user to select a paint attribute from anywhere along a specified range. Whereas, a user would normally be required to select either premium, improved or basic quality paint at the quality prompt 254, with a slider the user may select any quality that lies between premium and basic, for example. A slider is particularly desirable for choosing quality, sheen and color for the manufactured paint. A slider also allows a unique base paint to be created for every color.

After the attributes have been selected, control 80 correlates the desired attributes with a recipe number that will produce those attributes. The recipe number is then displayed and a valid or invalid display 258 displays whether the selected attributes have yielded a recipe number that is either valid or invalid. If the recipe number is invalid, the operator may enter different attributes. If the recipe number is valid then a verify prompt 260 prompts the operator to verify that the selected attributes are actually those desired by the operator. The attributes may then be saved in the local data storage device for future reproduction of the paint. If the operator touches an appropriate area of the screen to verify the attribute choices, then quantity prompt 240 prompts the operator to enter a quantity of paint to be filled. The remainder of the filling process may be identical or similar to that described above.

Figure 5:
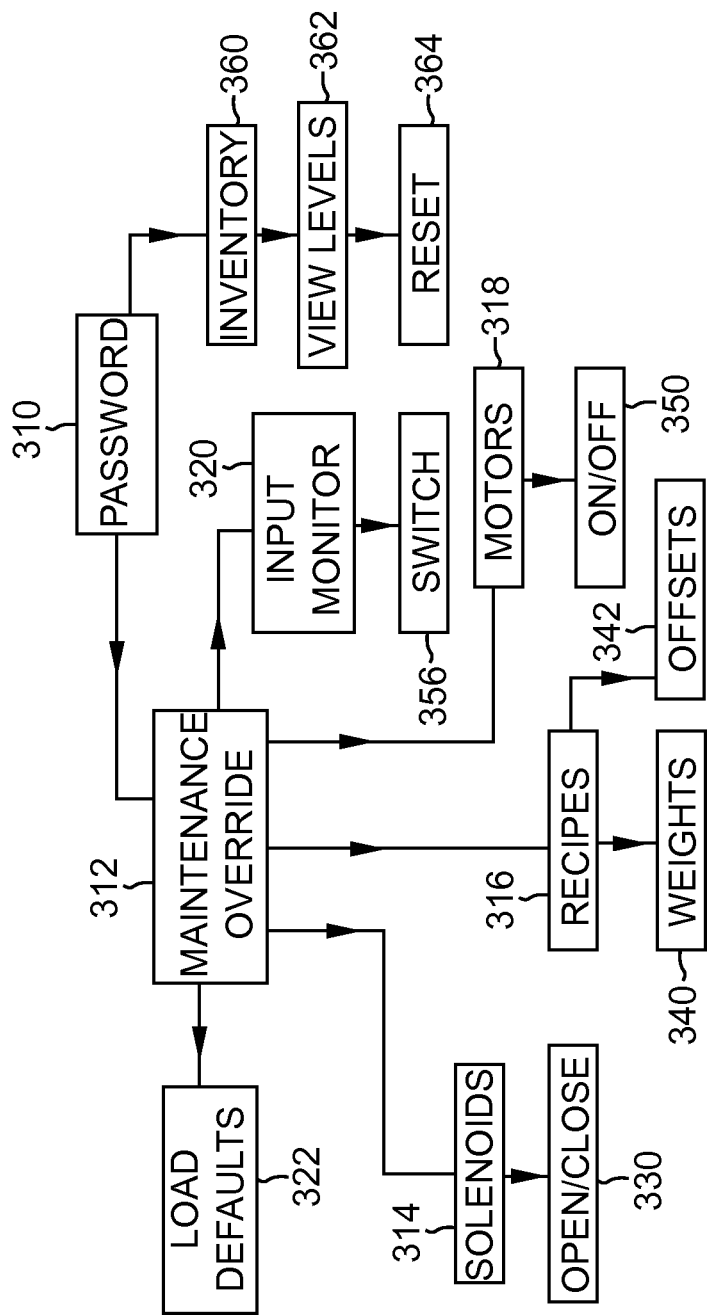
FIG. 5 is a flowchart depicting a method of maintaining a paint production apparatus according to the present invention.

In the embodiment depicted in FIG. 5, a number is selected as a password entry number, a number is selected as a maintenance override password, and a number is selected as an inventory password. If the password entry number is entered by the operator at recipe number prompt 218, then password prompt 310 prompts the operator to enter a password. Referring now to FIGS. 1 and 5, if the operator enters the maintenance override password at the password prompt 310, then a maintenance override prompt 312 prompts the operator to select either solenoid control 314, recipe control 316, motor control 318, input monitor 320, or load defaults 322.

If the operator selects solenoid control 314, then an open/close prompt 330 for each of the five solenoids 60, 62, 64, 66, 68 allows the operator to actuate each of the five solenoids independently to close or open valves 50, 52, 54, 56, 58. Solenoid control 314 is useful for troubleshooting when problems arise that might involve solenoids 60, 62, 64, 66, 68 or valves 50, 52, 54, 56, 58.

If the operator selects recipe control 316, then the operator is prompted to enter a recipe number. Upon entering a recipe number, a weight prompt 340 corresponding to each of the five aqueous prepaints prompts the operator to enter or adjust the weight of that prepaint for the recipe number entered. An offset prompt 342 corresponding to each of the five prepaints allows the operator to adjust the offset amounts discussed above. For the exemplary purposes of this disclosure, the offset amounts are adjusted after testing to assure that the offset amount represents the amount of additional prepaint that will be supplied to receiving reservoir 22 even after control 80 has sent a close signal to a solenoid 60, 62, 64, 66, or 68 and an off signal to motor 40, 42, 44, 46, or 48 (see FIGS. 1-3) to stop the flow of the prepaint.

If the operator selects motor control 318, then an on/off prompt 350 for each of the five motors 40, 42, 44, 46, 48 allows the operator to independently turn each of the five motors 40, 42, 44, 46, 48 on or off. Motor control 318 is useful for troubleshooting when problems arise that might involve motors 40, 42, 44, 46, 48 or pumps 30, 32, 34, 36, 38.

If the operator selects input monitor 320, a switch indicator 356 allows the operator to monitor the status of emergency stop switch 92 and position indicator 94 (see FIGS. 1-3). Input monitor 320 is useful for troubleshooting problems that might involve switch 92 or position indicator 94 (see FIGS. 1-3).

If the operator selects load defaults 322, then all of the default values for recipes, offsets, etc. will be reset to their original default values.

Referring back to password prompt 310, if the inventory password is entered at the password prompt then an inventory monitor 360 includes a view levels display 362 that displays current prepaint levels for each of the supply reservoirs 12, 14, 16, 18, 20 calculated by control 80 as described above (see FIGS. 1-4). Also, a reset prompt 364 corresponding to each supply reservoir 12, 14, 16, 18, 20 allows the current level for each supply reservoir 12, 14, 16, 18, 20 to be reset so that it shows the supply reservoir being full. This should be done when one of the supply reservoirs 12, 14, 16, 18, 20 is refilled.

As discussed above, control 80 may be a computer system such as a the programmable logic control system described herein. Control 80 may be programmed with a control program that causes control 80 to perform the various control and selection functions described above. The control program may be a program product in a variety of forms, and the present invention applies equally regardless of the particular type of signal bearing media to actually carry out the distribution of the program(s). Examples of signal bearing media include recordable type media such as floppy disks and CD ROMS, and transmission type media such as digital and analog communication links, including wireless communication links. The program product tangibly embodies a program of machine-readable instructions executable by a computer system having an operating system. The program product, in combination with a computer system, directs the computer system, such as the PLC described herein, to perform the embodiments of the current invention. As such, the control program may access Application Programmer Interfaces (APIs), if available, or contain programming that allows the control program to provide prompts to the operator, distribute on/off signals to the motors, distribute open/close signals to the solenoids, correlate recipe numbers with associated paint attributes and prepaint weights, etc. Essentially, the control program will contain programming to allow it to perform any of the functionality associated with FIGS. 1-5 and associated text, or other embodiments of the invention described herein or within the scope of the present invention.

Color Integrated Paint Production System.

Paints of various colors may be formed by mixing one or more liquid paint colorants with a base paint. A colorant refers to any substance that imparts color to another material or mixture. Colorants may be either dyes or pigments for example, such as concentrated pigment dispersions. For the exemplary purposes of this disclosure, 12 colorants may be used: Red, Yellow, Blue, Green, Orange, Violet, Yellow-Orange, Red-Orange, Red-Violet, Blue Violet, Blue-Green, and Yellow-Green. Some of the benefits of 12 colorants are better durability, better hiding and lower cost.

Paint color may be varied by using a different combination of paint colorants, or by changing the concentration of one or more of the colorants in the paint. The coloring power of a paint colorant may be varied by changing the pigment concentrations of the constituent pigments in the colorant.

Base paints are generally available as, for example, white base, pastel or light tone base, medium or mid-tone base, or deep base paints that can be tinted to various shades and depths by the use of liquid colorants. The level of opaque pigment (in most cases titanium dioxide) is varied to balance the degree of hue (lightness darkness). The maximum amount of colorant that is added to each base is dictated by the final color required, type and opacity of the particular colorant, and the level of opaque pigment in the base.

Colorants may be either aqueous colorants or universal colorants. For the exemplary purposes of this disclosure, colorants may be universal colorants (i.e., colored pigments milled in media compatible with paint vehicles added in small proportions to already prepared base paints to modify their color). Thus, universal colorants are materials containing a color pigment dispersed in a blend of surfactants and a liquid (most often a glycol). The level of pigment is dependent on the type, color strength and pigment surface area. Finer (i.e. high surface area) pigments, such as lampblack, are used in lower concentrations than larger (i.e. low surface area) pigments such as red iron oxide. The balance of the material is comprised of surfactants, glycol, and, in some cases, an extender pigment.

Accordingly, base paints produced in accordance with the present invention, such as those produced by apparatus 10 and the associated base paint production method as described above for example, may then receive colorant(s) to form colored paints. Alternatively, colorant(s) may be dispensed into a receiving reservoir 22 before dispensing the prepaints to form the base paint. Likewise, if used, the dilutant prepaint may be dispensed first, the colorant(s) may be dispensed next, and the remaining prepaint or prepaints may finally be dispensed. Similarly, the colorant(s) and the prepaints may be dispensed simultaneously. Notwithstanding, for the exemplary purposes of this disclosure, colorant(s) may be volumetrically, gravimetrically, or the like dispensed into any resulting aqueous base paint formed from a base paint production method of the present invention to produce a final colored paint.

Implementations may use different types of colorant and mixing systems to color and mix the prepaints. Accordingly, in some implementations, a paint production system to produce a final colored paint includes a paint production apparatus configured according to the present invention, such as apparatus 10 for example, that integrates a built in colorant system and a mixer to provide an all-in-one unit eliminating the need for a separate colorant dispenser and paint mixer. For example, the mixing system may be an in-line continuous mixing system into which the prepaints and colorants may be simultaneously admitted. As the prepaints and colorants flow through the mixing system, they may combined in one or more mixing chambers to form a substantially uniform mix. In a simple example, an in-line continuous mixing system may be formed by joining the colorant and prepaint lines into a common output line. Baffles may be added to the common output line or placed in a chamber to help ensure uniform mixing of the colorants and prepaints.

In other embodiments, a paint production system configured according to the present invention may not require agitating to mix the prepaints.

Alternatively, in some implementations, a colored paint production system to produce a final colored paint includes a paint production apparatus configured according to the present invention, such as apparatus 10 for example, and a separate colorant system and paint mixer, or the base paint may be put into one-gallon cans, barrels, or other containers and tinted at a later time.

Particularly useful to the present invention may be any of the colorant/tinting systems provided by and through Fluid Management, Inc. of Wheeling, Ill. Examples of Fluid Management tinting systems may be any of the automatic dispensers from their Accutinter line, such as the 8000 series.

Thus, for the exemplary purposes of this disclosure, a paint production system to produce a final colored paint may include a paint production apparatus configured according to the present invention, such as apparatus 10 for example, that integrates a built-in colorant system, but has a separate paint mixer. One clear advantage is that a receiving reservoir 22 containing a base paint does not have to be moved to a separate colorant system to be colored. Instead, the receiving reservoir 22 only has to be moved to a separate mixer. Another advantage is that by having a separate mixer, other base paints or colored paints may be prepared without having to wait because the previous paints are mixing apart from the color integrated paint production system.

Accordingly, colorants may be contained in separate storage reservoirs that may be coupled through fluid pumps and appropriate valving to dispensing outlets with the discharge therefrom being directed into a point of sale and/or use container for example. For the exemplary purposes of this disclosure, dispensing outlets may be positioned above receiving reservoir 22 so that colorants passing through the dispensing outlets drop directly into receiving reservoir 22. The colorant dispensing outlets may surround the valving for the prepaints and may be positioned at any angle.

Colorants may be volumetrically, gravimetrically, or the like dispensed by control 80 into any resulting aqueous base paint formed from a base paint production method of the present invention to produce a final colored paint. For the exemplary purposes of this disclosure, colorants may be volumetrically dispensed sequentially or simultaneously based on the size of any resulting aqueous base paint (e.g., quart to five gallons).

Additionally, embodiments of the present invention may automatically select the base paint type depending upon the color selected by the user. In the past, the operator would select a can of paint from the shelf and then select the color (the color of the paint resulting from tint being added is partially dependant upon the base paint used). This may result in inconsistencies between paint or problems with the final color. With particular embodiments the present invention, because each batch is consistent with the quantities of each prepaint being added, and the base paint components are selected in part based upon the color of paint the customer wants, the color can be consistent with every batch.

Furthermore, in particular embodiments, the system may include a color library from which the operator can input a color reference number for a different company and the system will automatically generate that color. Moreover, particular embodiments of the present invention may include a "color eye" to detect the color and recreate the color (or its closest match) in paint. A "color eye" is also known as a spectrometer. A spectrometer configured for use in paint manufacturing detects the color of an item it is shown and then instructs the colorant system how to color a paint to match. Alternate embodiments of the present invention may also comprise a gloss meter. A gloss meter detects the gloss or sheen of an item. A gloss meter may be configured to transfer this information to the present invention in order to match the sheen of an item with a paint. In this way, the color and sheen of an existing paint such as may be found on a wall, may be matched even if the color and sheen have faded or become discolored. In additional embodiments, the spectrometer may measure both color and gloss or sheen, which would eliminate the need for an additional gloss meter. An example of this type of spectrometer is the Spectro-Guide by BYK-Gardner.

The local data storage device may be used to store the color library mentioned above. It may also store recipes or attributes for previously produced paints.

Reflectance is the proportion of light that a surface reflects compared to the amount of light that falls on that surface. Dark, matt and/or textured surfaces absorb a lot of light and have low reflectance values. Light, glossy and/or smooth surfaces reflect most of the light that falls on them and have high reflectance values. Reflectance may be determined by using a Spectrophotometer or by any other means. Reflectance values for paint created by the present invention may be stored in the local data storage device. By storing information about the reflectance, the paint may be recreated at a future date even if the formulas for the base paints have changed. This information also allows evaluation of changes to color and sheen due to fading so that a matching touchup paint may be created years later.

Additionally, the software may be configured to propose contrasting colors or a color scheme to match the color.

Accordingly, a customer or contractor for example may select a desired quantity of paint having a desired paint color. The desired paint color has known ratios of various paint colorants to a base paint. After any colorant(s) are added, the resulting base paint and colorant composition may then be uniformly mixed by a paint mixer to produce the desired colored paint. For example, the user may identify the color that the base paint is to be colored. Control 80 may query a database table to determine an appropriate tint level for the selected color. Such a database query may be implemented using a simple database table that includes records associating available colors with tint levels. It should be understood that available software and computer technologies allow a large number of other variations in the interface and a large number of other types of interfaces for the receipt of paint selection input data. For example, a bar code scanner may be used to scan a bar code printed on a paint chip sample card. The data received from the bar code scan may be used to query a paint formulation database.

Portable/Mobile Paint Production System.

A base paint or colored paint produced according to the present invention may, for example, be sold to a consumer or a contractor, who may then use it at an application location, or, for example, it may be sold to a paint supplier, who will in turn sell it to a consumer or a contractor, who may then use it at an application location. However, it will be understood by those of ordinary skill in the art that paint production apparatuses of the present invention, such as apparatus 10, and/or color integrated paint production systems of the present invention, are not limited to operation and use at any particular location. Additionally, it will be understood by those of ordinary skill in the art that the invention is not limited to any particular point of sale and/or point of use. Rather, any description relating to a particular point of use or sale is for the exemplary purposes of this disclosure, and those of ordinary skill in the art will also understand that the invention may also be utilized in a wide variety of settings, such as store-within-a-store and stand-alone store settings, a retail paint store, a paint department of a retail store, a retail store, a kiosk, a paint manufacturing facility, a manufacturing facility that uses paint, an application sight for example, and/or the like. Accordingly, while it will be clear from the disclosures provided herein that paint can be made at any location using the present invention, in a particular application for the invention, a drive-through paint factory/store may be included. As with many aspects of the invention, the small size of certain embodiments of the present invention make it particularly useful for applications where not much space is available. Because some embodiments of the present invention require very small spaces (i.e. less than 1000 sq. feet and in some examples less than 400 sq. feet), they may be input into many places that a paint factory for a full line of paints could not, and even into many places that a conventional paint store carrying a full line of paints could not be placed. Size, including the lack of need to stock a large paint line inventory, is another advantage of the present invention.

Notwithstanding, those of ordinary skill in the art will also understand that paint production apparatuses of the present invention, such as apparatus 10, and/or color integrated paint production systems of the present invention, may comprise a mobile/portable paint production system that is configured to move from any location to any other location (e.g. from a retail paint store to construction site, from a first construction site to a second construction site, and the like) and produce base paints and/or colored paints en route and/or at the various locations on-demand. Thereby reducing waste as the exact amount of paint may be made on site and there is no need to buy more paint than is needed or to send someone to a paint store to buy more paint. A mobile paint production system would also reduce time wasted as the paint could be produced on site or en route while the painters tape.

Figure 6:
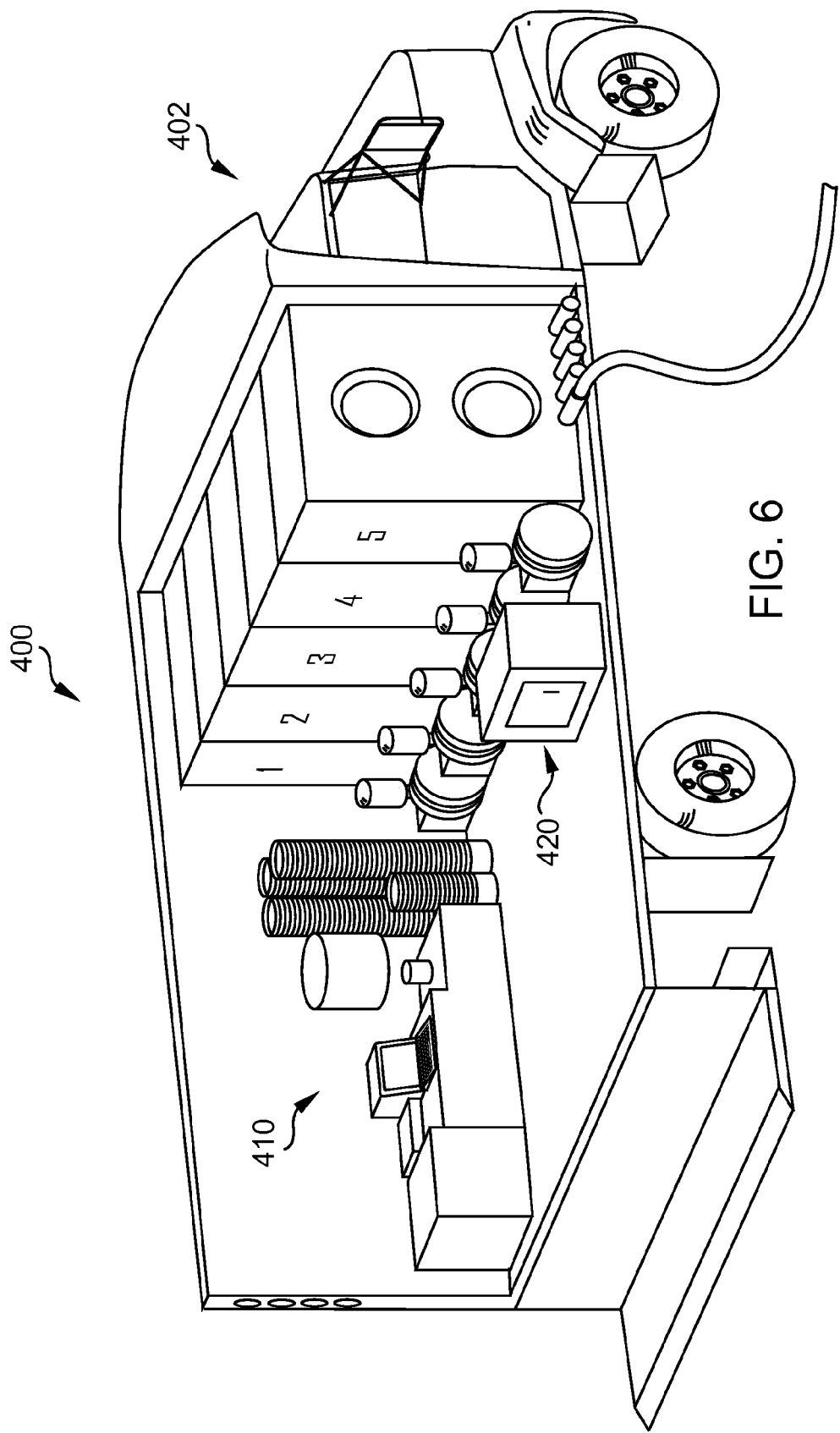
FIG. 6 is a broken away perspective view of a portable paint production system configured according to an embodiment of the present invention.

Accordingly, although the invention may be readily adapted to a variety of embodiments of a portable/mobile paint production system, with reference to FIG. 6, mobile paint factory 400 is an example of a portable paint production system of the invention. Mobile paint factory 400 generally includes a vehicle 402 carrying a color integrated paint production system 410 and separate paint mixer. Also included may be a plurality of portable paint containers or buckets into which color integrated paint production system 410 may dispense prepaints and colorants to form the base paints and/or colored paints respectively for a consumer at various locations on-demand.

Vehicle 402 may be a standard, covered, flat bed truck. Integrated color integrated paint production system 410 may be a unit as described previously comprising a paint production apparatus integrating a built-in colorant system. Color integrated paint production system 410 and separate paint mixer 420 may be powered by any power source known by those of ordinary skill in the art. Examples of conventional power sources include gas, electric, and solar. For the exemplary purposes of this disclosure, color integrated paint production system 410 and separate paint mixer 420 may be powered by a conventional generator.

Describing the operation and use of mobile paint factory 400, prepaints may be loaded into storage reservoirs/tanks associated with color integrated paint production system 410 through loading ports/valves located on the outside of vehicle 402 for example at a prepaint storage or manufacturing location. Next, an off-site customer or contractor for example may select a desired quantity of base paint having a desired paint color for example. Then, according to any of the paint production methods as described above for example, en-route and/or at the customer's location, which is different from the prepaint manufacturing or storage location (e.g., a construction site), one operator using color integrated paint production system 410 may dispense a predetermined amount of appropriate prepaints, including any colorants if necessary, into one or more portable paint buckets. Finally, the portable paint bucket(s) containing the resulting prepaint composition(s) and/or colored prepaint composition(s) may then be uniformly mixed by paint mixer 420 to produce the desired base architectural coating(s) and/or colored architectural coating(s).

Thus, from vehicle 402, one operator using color integrated paint production system 410 may effectively produce a plurality of lines (e.g., the full interior and exterior spectrum) of base and/or colored architectural coatings for example (with superior quality and at less cost than any competitor would be able or willing to sell) en-route and/or at a construction site. For example, an operator may conveniently supply all of the paint needs of a major development or project upon demand. That is, an operator may produce base paint or colored paint on demand for a contractor at a first job or construction site in a development for example and then to move to a second job or construction site in the same or different development and produce paint en-route and/or at the second site for another or the same contractor.

It will be understood by those of ordinary skill in the art that portable paint production systems of the invention are not limited to color integrated paint production system 410 or vehicle 402. Any paint production system or paint production apparatus of the invention may be used with any mode of transportation (e.g. vehicles, boats, trains, planes). For example, a paint production system of the invention may be carried by a trailer pulled behind a towing vehicle.

Figure 7:
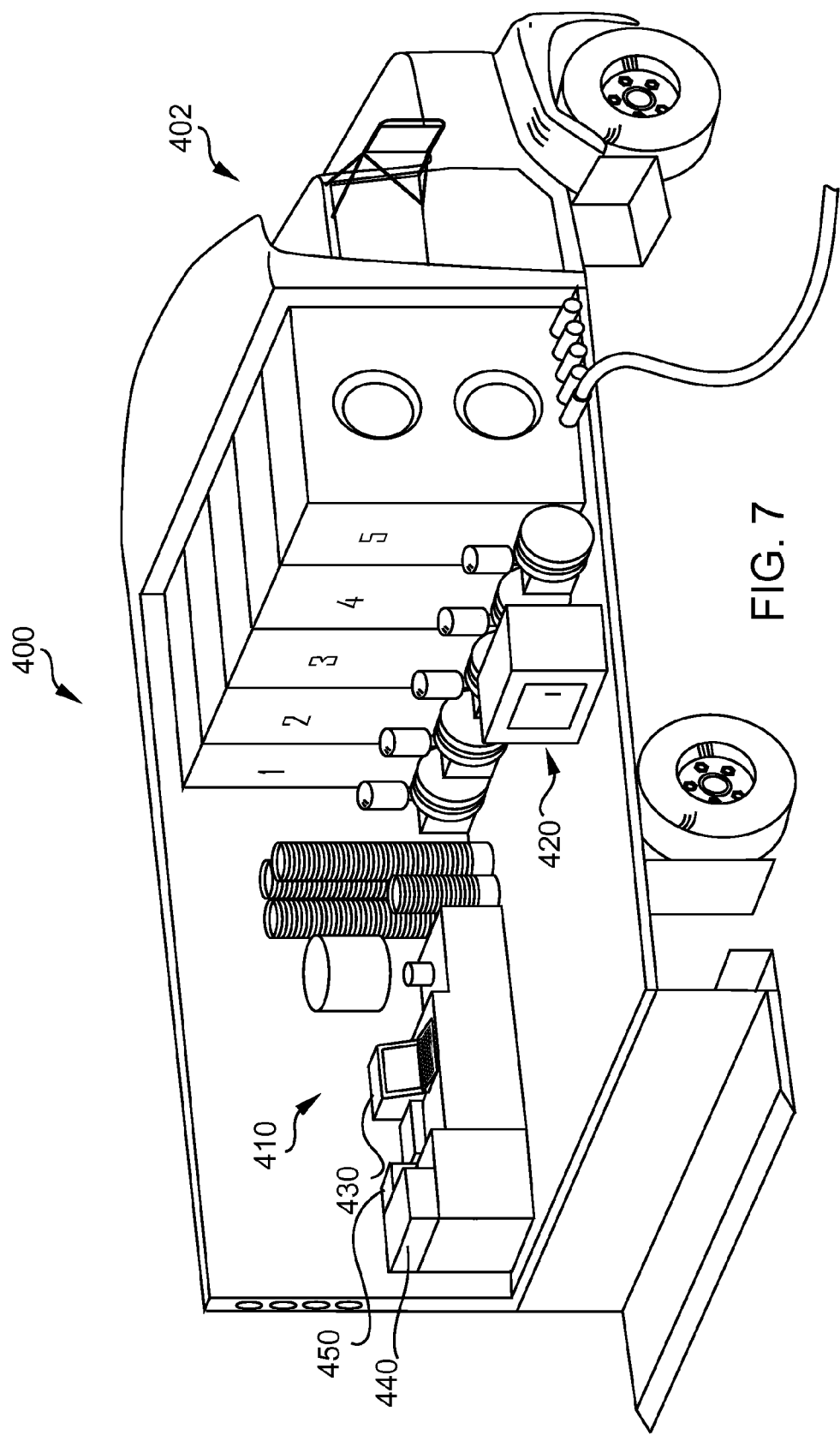
FIG. 7 is a broken away perspective view of an alternate embodiment of a portable paint production system configured according to an embodiment of the present invention.

FIG. 7 illustrates an alternate embodiment of a portable paint production system. Color integrated paint production system 410 may be coupled to local data storage device 430. Local data storage device 430 is any device that may be utilized to store data concerning paint formulas, reflectance and the like, such as a local hard drive, random access memory (RAM), or other magnetic or electronic data storage medium. Local data storage device 430 may be used to store information concerning reflectance of paints as described above. It may also be used to store paint formulas, and a library of paint colors.

Also coupled to the color integrated paint production system 410 is a spectrometer 440. Spectrometer 440 may be used to select the color for a paint. For example, the spectrometer 440 may be used on an item such as a pillow in order to determine the color of the pillow. This information is converted to a formula for a paint color and this formula is used as the selection of the color attribute. The spectrometer 440 may also be remotely linked to the color integrated paint production system 410 or else the spectrometer 440 may be able to store information about a color until it is connected to the color integrated paint production system 410. This configuration would allow the spectrometer 440 to be used on a previously painted wall or other item which is not portable. The color integrated paint production system 410 would then be able to match the color of the wall in order to create a touchup paint. It is even possible that with a portable color integrated paint production system 410 as seen in FIG. 7, the spectrometer 440 may be hardwired to the color integrated paint production system 410 and still be able to access a wall to create a color match. The color created by the spectrometer 440 would be located on a slider, as described above, and a user would be able to alter the value by simply moving a indicator on the slider.

A gloss meter 450 may also be coupled to the color integrated paint production system 410. A gloss meter 450, as discussed above, may be used to determine the gloss or sheen of an item or an existing painted wall or structure. The information from the gloss meter 450 may then be converted to a paint formula in order to duplicate the gloss of the item. Like the spectrometer 440, the gloss meter 450 may be remotely linked to the color integrated paint production system 410 or else the gloss meter 450 may be able to store information about the sheen or gloss of an item until it is connected to the color integrated paint production system 410. This configuration would allow the gloss meter 450 to be used on a previously painted wall or other item which is not portable. The color integrated paint production system 410 would then be able to match the sheen of the wall in order to create a touchup paint. It is even possible that with a portable color integrated paint production system 410 as seen in FIG. 7, the gloss meter 450 may be hardwired to the color integrated paint production system 410 and still be able to access a wall to create a sheen match. The sheen value created by the gloss meter 450 would be located on a slider, as described above, and the value could be altered by a user moving a indicator on the slider.

Summary.

Overall, the present invention provides the advantage of allowing the production a wide variety of aqueous base and colored paints with a limited number of aqueous prepaints. The aqueous prepaints may be stored and aqueous base or colored paints may be produced on-demand in the same location (i.e., the same building or complex of buildings) as the sale to an end paint consumer, or may be produced en route to (e.g. from a retail paint store to construction site) and/or at various locations (e.g. a construction site) on-demand by a portable paint production system. This is made possible because each of the aqueous prepaints may be stored for long periods of time without significant settling. Accordingly, the present invention alleviates the current requirement for paint distributors or stores to maintain large inventories of a wide variety of paint types and to guess about the types of paints that consumers might demand.

The embodiments and examples set forth herein were presented in order to best explain the invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, unless otherwise specified, any components of the invention indicated in the drawings or herein are given as an example of possible components and not as a limitation. Similarly, unless otherwise specified, any steps or sequence of steps of any method of the invention indicated herein are given as examples of possible steps or sequence of steps and not as limitations.

The invention claimed is:

1. A mobile paint factory for producing a plurality of lines of paints from a plurality of prepaints en route to and/or at various locations, the mobile paint factory comprising:
   a vehicle;
   a paint production system located on the vehicle, the paint production system comprising a plurality of supply reservoirs, a plurality of prepaints stored in the plurality of supply reservoirs, wherein none of the prepaints are paints, at least one receiving reservoir for receiving at least two of the plurality of prepaints;
   a control coupled to the paint production system;
   a local data storage device coupled to the control, wherein the local data storage device is used to store information about paints made from the plurality of prepaints;
   a gloss meter coupled to the control;

a spectrometer coupled to the control;
a colorant system located on the vehicle and coupled to the spectrometer, wherein the colorant system is used to dispense paint colorant; and
a touchscreen coupled to the control, wherein the touchscreen displays a prompt asking the user to select a value for a paint attribute on a slider.

2. The mobile paint factory of claim 1, wherein the paint attribute is sheen.

3. The mobile paint factory of claim 1, wherein the gloss meter is used to select the sheen of paint to be manufactured.

4. The mobile paint factory of claim 1, wherein the gloss meter is used to match the sheen of a previously applied paint.

5. The mobile paint factory of claim 1, wherein the spectrometer is used to select the color of paint to be produced.

6. The mobile paint factory of claim 5, wherein the spectrometer is used to match the color of previously applied paint.

7. The mobile paint factory of claim 1, wherein the local data storage device stores information about reflectance of a selected paint.

8. The mobile paint factory of claim 7, wherein the information about reflectance is used to recreate the selected paint at a future time.

9. A method of producing a plurality of lines of user-selected paints from a plurality of prepaints en route to and/or at various locations, the method comprising:

providing a mobile paint factory comprising:
a vehicle;
a paint production system located on the vehicle, the paint production system comprising, a plurality of aqueous prepaints, a plurality of supply reservoirs containing the plurality of aqueous prepaints, at least one receiving reservoir wherein the
receiving reservoir receives at least two of the plurality of aqueous prepaints;
a control coupled to the paint production system;
a local data storage device coupled to the control; and
a touchscreen coupled to the control, wherein the touchscreen displays a prompt asking the user to select a value for a paint attribute on a slider;

automatically dispensing through the paint production system predetermined amounts of appropriate prepaints into the receiving reservoir, wherein none of the prepaints are paints prior to being dispensed;

determining reflectance of the produced paints;

storing information about the reflectance in the local data storage device; and recreating the paints by using the information about the reflectance in the local data storage device.

* * * * *